US010912165B2

(12) United States Patent
Yoshino et al.

(10) Patent No.: US 10,912,165 B2
(45) Date of Patent: Feb. 2, 2021

(54) MICROWAVE HEATING DEVICE

(71) Applicant: Panasonic Intellectual Property Management Co., Ltd., Osaka (JP)

(72) Inventors: Koji Yoshino, Shiga (JP); Masafumi Sadahira, Shiga (JP); Masayuki Kubo, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 203 days.

(21) Appl. No.: 16/081,038

(22) PCT Filed: Mar. 23, 2017

(86) PCT No.: PCT/JP2017/011664
§ 371 (c)(1),
(2) Date: Aug. 30, 2018

(87) PCT Pub. No.: WO2017/164290
PCT Pub. Date: Sep. 28, 2017

(65) Prior Publication Data
US 2019/0090318 A1 Mar. 21, 2019

(30) Foreign Application Priority Data
Mar. 25, 2016 (JP) .................. 2016-061033

(51) Int. Cl.
*H05B 6/68* (2006.01)
*F24C 7/02* (2006.01)
(Continued)

(52) U.S. Cl.
CPC .............. *H05B 6/687* (2013.01); *F24C 7/02* (2013.01); *H01P 5/184* (2013.01); *H05B 6/705* (2013.01); *H05B 6/707* (2013.01); *H05B 6/725* (2013.01)

(58) Field of Classification Search
CPC .......... H05B 6/725; H05B 6/705; H05B 6/72; H05B 6/6411; H05B 6/687; H05B 6/707;
(Continued)

(56) References Cited
U.S. PATENT DOCUMENTS 5,986,249 A * 11/1999 Yoshino ................. H05B 6/688
219/746
6,274,859 B1 * 8/2001 Yoshino .................. H05B 6/66
219/746
(Continued)

FOREIGN PATENT DOCUMENTS

| JP | 7-078681 | 3/1995 |
| JP | 2003-234174 | 8/2003 |
| WO | 2014/119333 | 8/2014 |

OTHER PUBLICATIONS

International Search Report of PCT application No. PCT/JP2017/011664 dated May 16, 2017.

*Primary Examiner* — Ibrahime A Abraham
*Assistant Examiner* — Chris Q Liu
(74) *Attorney, Agent, or Firm* — Wenderoth, Lind & Ponack, L.L.P.

(57) ABSTRACT

The present invention has a configuration of controlling a motor so as to stop a radiation antenna when the radiation antenna faces in a direction in which a reflected wave detection amount is minimized and to stop the radiation antenna when the radiation antenna faces in a different direction different from the direction in which the reflected wave detection amount is minimized. According to this configuration, first, the radiation antenna stops when facing in the direction in which the reflected wave detection amount is minimized. This extends a heating time under the most efficient condition, improving a heating efficiency in comparison with when the radiation antenna constantly rotates. Second, the radiation antenna stops when facing in (Continued)

the different directions. This causes uneven heating when the radiation antenna faces in the direction in which the reflected wave detection amount is minimized as well as when the radiation antenna faces in the different directions. As a result, the uneven heating is cancelled out by the uneven heating each other caused at different locations. In this way, it is possible to achieve the even heating.

6 Claims, 11 Drawing Sheets

(51) Int. Cl.
  *H05B 6/72* (2006.01)
  *H05B 6/70* (2006.01)
  *H01P 5/18* (2006.01)
(58) Field of Classification Search
  CPC ........ H05B 6/6408; H05B 6/66; H05B 6/688;
      H05B 6/70; H05B 6/704; H05B 6/74;
      H05B 2206/043; H05B 6/6414; H05B
      6/6447; H05B 6/645; H05B 6/6464;
      H05B 6/6479; H05B 6/6482; H05B
      6/6494; H05B 6/666; H05B 6/68; H05B
      6/766

USPC ....... 219/749, 690, 746, 600, 660, 681, 695,
     219/720, 748, 751, 754, 696, 750, 708,
     219/745, 747
See application file for complete search history.

(56) References Cited

U.S. PATENT DOCUMENTS

| | | | |
|---|---|---|---|
| 6,614,011 B2* | 9/2003 | Omori | H05B 6/72 219/748 |
| 2006/0096979 A1* | 5/2006 | Kaneko | H05B 6/6411 219/749 |
| 2007/0215608 A1* | 9/2007 | Yoshino | H05B 6/74 219/681 |
| 2010/0059509 A1* | 3/2010 | Imai | H05B 6/72 219/690 |
| 2010/0276417 A1* | 11/2010 | Uchiyama | H05B 6/6402 219/719 |
| 2013/0087555 A1* | 4/2013 | Hirano | H05B 6/687 219/720 |
| 2015/0244055 A1 | 8/2015 | Yoshino et al. | |

* cited by examiner

| ANGLE OF RADIATION ANTENNA | HEAT DISTRIBUTION OF GRILL PLATE |
|---|---|
| (RIGHT) 90°  |  |
| (LEFT) 270°  |  |
| ALTERNATE CONTROL (STOP AT 90° FOR 10 SEC AND STOP AT 270° FOR 15 SEC) |  |

FIG. 8

| ANGLE OF RADIATION ANTENNA | ABSORPTION AMOUNT | STOP TIME | IMAGE OF HEATED AREA |
|---|---|---|---|
| 0° (REAR) | 0.52 | 10 SEC | |
| 90° (RIGHT) | 1 | 5 SEC | |
| 180° (FRONT) | 0.63 | 8 SEC | |
| 270° (LEFT) | 0.86 | 6 SEC | |

MICROWAVE HEATING DEVICE

This application is a U.S. national stage application of the PCT International Application No. PCT/JP2017/011664 filed on Mar. 23, 2017, which claims the benefit of foreign priority of Japanese patent application No. 2016-061033 filed on Mar. 25, 2016, the contents all of which are incorporated herein by reference.

TECHNICAL FIELD

The present invention relates to a microwave heating device that subjects an object to heating with a microwave and that detects part of the microwave propagating inside a waveguide and controls the heating.

BACKGROUND ART

Microwave ovens are a conventionally known, representative example of microwave heating devices. A typical microwave oven has a magnetron as a microwave generator. In this microwave oven, the magnetron radiates a microwave, which then passes through a waveguide and reaches a heating chamber. This microwave heats an object (food) placed inside the heating chamber.

Such microwave ovens need to heat an object as evenly as possible so as to suppress uneven heating of the object. Therefore, some contemporary microwave ovens employ a turntable type and a rotating antenna type, for example. In the turntable type, an object to be heated itself rotates; in the rotating antenna type, a rotatable antenna is disposed in a part that radiates a microwave to within a heating chamber via a waveguide.

Two kinds of microwaves (incident or progressive wave and reflected wave) are present within the waveguide in a microwave oven. The incident or progressive wave propagates in the direction from the magnetron to the heating chamber, whereas the reflected wave is not absorbed in the object and thus propagates in the direction from the heating chamber to the magnetron. This reflected wave changes, depending on a shape, material, location, and other properties of the object to be heated. Also, the reflected wave changes, depending on directions in which the above turntable and antenna face. To heat an object evenly, thus, it is necessary to grasp changes in the incident and reflected waves.

In one method of monitoring incident and reflected waves inside a waveguide, a directional coupler is used. This directional coupler has a function of separating an incident and reflected waves present inside a waveguide from each other. In addition, directional coupler needs to attenuate a microwave to some extent (for example, by 30 dB) in order to suppress its presence from affecting the propagation of the microwaves inside the waveguide. For that purpose, the directional coupler inevitably has a considerably large size. Therefore, many microwave ovens intended for ordinary households have not been equipped with such large-sized directional couplers.

However, small-sized directional couplers have been recently developed (for example, refer to PTL 1). Those small-sized directional couplers are expected to be used in microwave ovens.

Moreover, a microwave heating device that controls a stop location of the rotating antenna, based on the incident and reflected waves inside the waveguide has been proposed (for example, refer to PTL 2).

The microwave heating device disclosed in PTL 2 first calculates a reflectivity-associated value (reflection coefficient F or voltage standing wave ratio ρ) from the incident and reflected waves. Based on this resultant value, then, the microwave heating device selects three rotation locations of the rotating antenna at which the value becomes the smallest and second and third smallest when the rotating antenna rotates by 360 degrees. Then, the microwave heating device stops the rotating antenna at each of the selected rotation locations for 10 seconds. When the value indicates a small reflectivity, the microwave is not largely reflected. By stopping the rotating antenna at these rotation locations, thus, it is possible to heat an object efficiently.

The microwave heating device disclosed in PTL 2 successfully heats the object efficiently by stopping the rotating antenna, but may cause uneven heating that is attributed to the stopping of the rotating antenna.

When the rotating antenna stops for a long time while facing in a direction in which the object is heated efficiently, the object may be heated with a microwave having a constant distribution for that time. This might make the uneven heating of the object more prominent.

Basically, the rotating antenna rotates for the purpose of even heating. Controlling the stop of the rotating antenna may defeat this purpose. This means that a further study is required to avoid lowering of an even heating performance.

As described above, a configuration of conventional microwave heating devices may have difficulty both improving heating efficiency and maintaining even heating.

CITATION LIST

Patent Literature

PTL 1: WO 2014/119333
PTL 2: Unexamined Japanese Patent Publication No. 2003-234174

SUMMARY OF THE INVENTION

The present invention provides a microwave heating device that can both improve a heating efficiency and maintain even heating.

A microwave heating device according to the present invention includes: a heating chamber that accommodates an object to be heated; a microwave generator that generates a microwave to be supplied to the heating chamber; a wave guide through which the microwave generated by the microwave generator propagates to the heating chamber; a radiation antenna that radiates the microwave propagating inside the waveguide to the heating chamber; and a rotary driver that rotates the radiation antenna. Furthermore, the microwave heating device includes: a reflected wave detector that detects at least part of a reflected wave inside the waveguide; and a controller that controls a direction in which the radiation antenna faces by controlling the rotary driver based on a reflected wave detection amount detected by the reflected wave detector. The controller controls the rotary driver so as to stop the rotation of the radiation antenna when the radiation antenna faces in the direction in which the reflected wave detection amount is minimized and when the radiation antenna faces in a different direction different from the direction in which the reflected wave detection amount is minimized.

According to this configuration, first, the radiation antenna stops its rotation when facing in a direction in which the reflected wave detection amount is minimized. The object is thereby heated for an extended period of time under the most efficient heating condition. As a result, the heating efficiency is improved in comparison with a case where heating is performed while the radiation antenna is constantly rotating. Second, the radiation antenna stops its rotation when facing in the different direction different from the direction in which the reflected wave detection amount is minimized. In this case, the microwave radiated from the radiation antenna causes uneven heating when the radiation antenna stops while facing in the direction in which the reflected wave detection amount is minimized as well as in the different direction.

However, the effect of the uneven heating caused in relation to the direction in which the reflected wave detection amount is minimized is expected to be canceled out by the effects of the uneven heating caused in relation to the different direction. Consequently, it is possible to provide even heating in comparison with the case where the radiation antenna stops only when facing in the direction in which the reflected wave detection amount is minimized. In other words, it is possible to both improve heating efficiency and perform even heating at the same time.

BRIEF DESCRIPTION OF DRAWINGS

FIG. 8 illustrates a relationship between the direction in which the radiation antenna according to this exemplary embodiment faces and a heated area.

DESCRIPTION OF EMBODIMENTS

Some exemplary embodiments of the present invention will be described below with reference to the accompanying drawings. It should be noted that those exemplary embodiments are not intended to limit the present invention.

First Exemplary Embodiment

Figure 1:
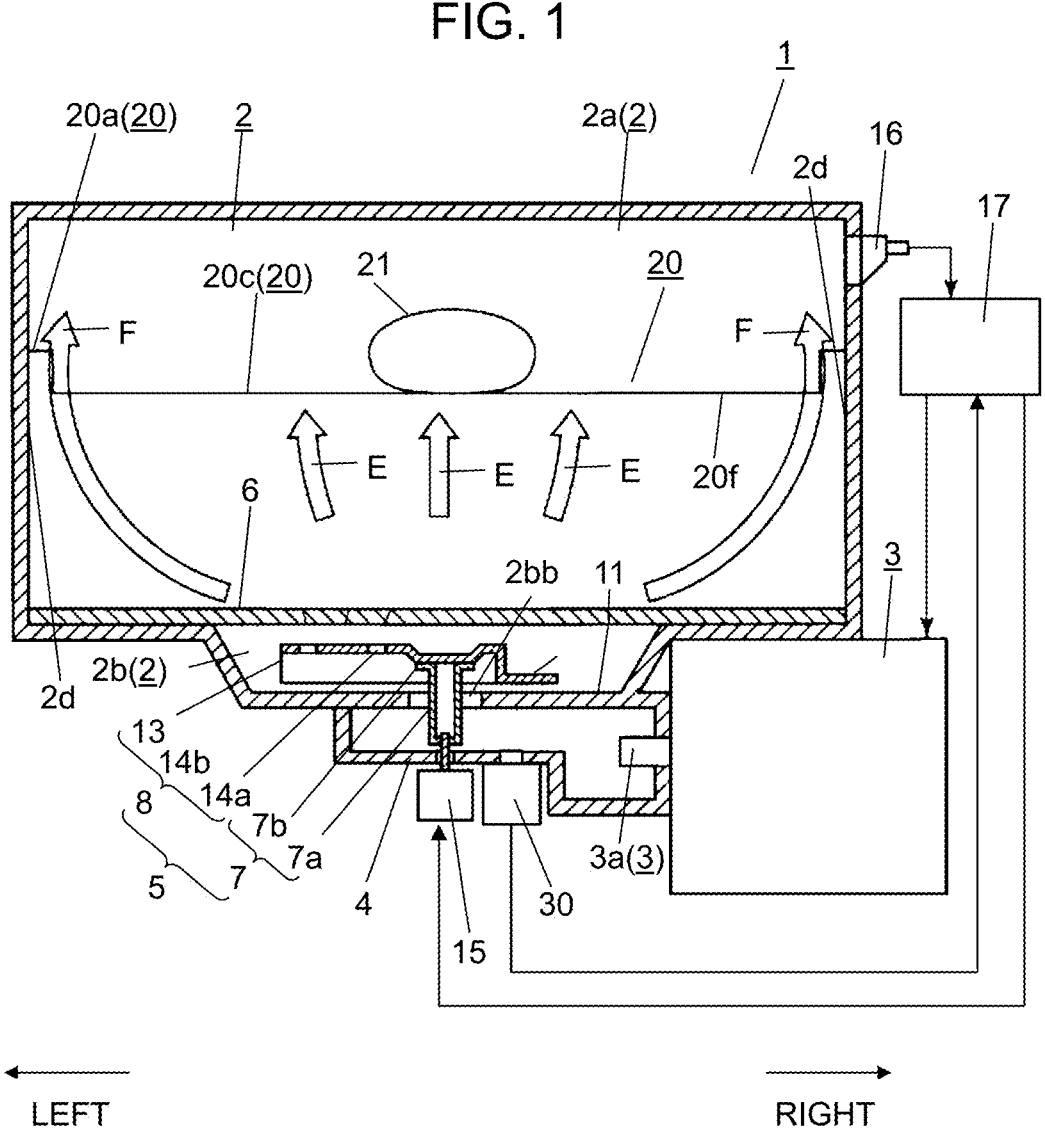
FIG. 1 is a sectional view of a schematic configuration of a microwave heating device according to a first exemplary embodiment of the present invention.

FIG. 1 is a sectional view of a schematic configuration of a microwave oven, which is an example of a microwave heating device according to a first exemplary embodiment of the present invention. More specifically, FIG. 1 is a sectional view of microwave oven 1 as seen from the front.

In the following description, a horizontal direction of microwave oven 1 corresponds to a horizontal direction on the page of FIG. 1. A front-back direction of microwave oven 1 corresponds to a direction which is vertical to the page of FIG. 1 and in which the front of the device is connected to the back.

As illustrated in FIG. 1, microwave oven 1 according to the present exemplary embodiment includes: heating chamber space 2 defined by outer walls; magnetron 3; waveguide 4; radiation antenna 5; and mounting table 6. Heating chamber space 2 contains: heating chamber 2a that encloses a space over mounting table 6; and power feeding chamber 2b that encloses a space under mounting table 6. Magnetron 3 is an example of a microwave generator that generates a microwave. Waveguide 4 is an example of a transmitting section via which the microwave generated by magnetron 3 propagates to within heating chamber space 2. Radiation antenna 5 is an example of a waveguide-structured antenna.

Radiation antenna 5 that radiates the microwave inside waveguide 4 to within heating chamber space 2 is provided inside the space in power feeding chamber 2b under mounting table 6.

Mounting table 6 disposed inside heating chamber space 2 has a flat surface on which a food that is object 21 to be heated is placed. Mounting table 6 is disposed so as to cover, from the above, entire power feeding chamber 2b in which radiation antenna 5 is provided. Mounting table 6 covers power feeding chamber 2b so as to prevent radiation antenna 5 from being exposed to heating chamber 2a and forms a bottom surface of heating chamber 2a. Furthermore, a configuration in which mounting table 6 has a flat upper surface (mounting surface) allows a user to easily access the food and wipe dust or other contaminants adhering to mounting table 6.

Mounting table 6 is made of a material, such as glass or ceramic, that transmits microwaves easily. Therefore, when radiation antenna 5 in power feeding chamber 2b disposed under mounting table 6 radiates a microwave, this microwave reliably propagates to within the space in heating chamber 2a over mounting table 6.

Radiation antenna 5 includes coupling part 7 and waveguide structure 8 that are coupled to each other. When magnetron 3 radiates the microwave to within waveguide 4, coupling part 7 delivers this microwave to waveguide structure 8. Waveguide structure 8, which has a box-shaped waveguide structure, for example, leads the microwave delivered by coupling part 7 to within heating chamber 2a.

Coupling part 7 includes coupling shaft 7a and flange 7b. Coupling shaft 7a is coupled to motor 15, which serves as a rotary driver. Waveguide structure 8 is coupled to motor 15 via coupling shaft 7a of coupling part 7 and rotates under the control of controller 17, more specifically, in response to a control signal from controller 17, details of which will be described later. As a result, radiation antenna 5 is driven by motor 15 and thus rotates around coupling shaft 7a of coupling part 7. In this way, a stop location, a rotation period, and a rotation speed, for example, of radiation antenna 5 are controlled. Coupling part 7 is made of a metal, such as aluminized steel. A portion of motor 15 which is coupled to coupling part 7 is made of a fluorine resin, for example.

As illustrated in FIG. 1, coupling shaft 7a of coupling part 7 is disposed so as to pass through opening 2bb via which waveguide 4 communicates with power feeding chamber 2b. In this case, a gap has a predetermined length, such as 5 mm or more in order to avoid any danger, such sparks, between opening 2bb and coupling shaft 7a passing through opening 2bb. Reserving the gap in this manner enables coupling shaft 7a to efficiently lead the microwave from waveguide 4 to waveguide structure 8 of radiation antenna 5. If the gap is insufficiently small, sparks may be generated, in which case the discharged energy consumes great amounts of electric power. As a result, the electric power radiated to within heating chamber space 2 may excessively decrease, thereby heating the object less efficiently. Even if the gap can prevent sparks, the gap of a small size may cause the electric power to be lost in a conductive part, thereby generating heat. In which case, considerable amounts of electric power are consumed. As a result, the electric power radiated to within heating chamber space 2 may decrease, thereby heating the object less efficiently. For the above reasons, the gap of 5 mm is reserved in the present exemplary embodiment and thus helps efficient heating of the object. The gap of 5 mm is set, assuming that a microwave oven is a typical microwave heating device, for example, whose maximum output is about 1000 W. Obviously, the size of the gap may vary depending on the output level.

Waveguide structure 8 of radiation antenna 5 includes, as main components, open end 13 and a plurality of openings 14a, 14b from which a microwave is to be radiated. The microwave is radiated from open end 13 in a predetermined direction.

In microwave oven 1 according to the present exemplary embodiment, radiation antenna 5 rotates, because coupling part 7 of radiation antenna 5 is coupled to motor 15. In relation to this rotation, the microwave is radiated in a different direction from radiation antenna 5.

As illustrated in FIG. 1, microwave oven 1 is provided with infrared sensor 16 in an upper area on a side surface of heating chamber 2a. Infrared sensor 16 detects internal temperatures of a plurality of regions in heating chamber 2a. Then, infrared sensor 16 transmits the detection signals (results) to controller 17.

Waveguide 4 is provided with directional coupler 30, which serves as a reflected wave detector in the present exemplary embodiment. Directional coupler 30 detects an incident wave detection amount and a reflected wave detection amount of the microwave propagating inside waveguide 4 and then transmits detected sensing signals to controller 17. In this case, the incident wave detection amount is detected by means of a sensing signal related to an incident wave (progressive wave) of the microwave propagating from magnetron 3 toward radiation antenna 5. Likewise, the reflected wave detection amount is detected by means of a sensing signal related to a reflected wave of the microwave returning from radiation antenna 5 toward magnetron 3.

Controller 17 controls an oscillation of magnetron 3 and the rotation of motor 15, based on the sensing signals from infrared sensor 16 and directional coupler 30 described above.

In FIG. 1, grill plate 20 is placed over mounting table 6, and object 21 to be heated is placed on grill plate 20.

Specifically, grill plate 20 is placed on side walls 2d of heating chamber 2a. More specifically, grill plate 20 is placed on rails (not illustrated) formed on right and left side walls 2d of heating chamber 2a. Each of right and left side walls 2d extends in the front-back direction. Providing the side rails in this manner enables grill plate 20 to be placed higher than mounting table 6 that forms the bottom surface of heating chamber 2a inside heating chamber 2a. Furthermore, multiple couples of rails may be provided on right and left side walls 2d of heating chamber 2a at different levels (for example, at a high, middle, and low levels). Providing the rails at the plurality of levels allows grill plate 20 to be placed at an adjustable height.

In this way, microwave oven 1, which is an example of the microwave heating device according to the present exemplary embodiment, is configured.

Next, a description will be given below of a configuration of power feeding chamber 2b in the microwave heating device, with reference to FIGS. 2A and 2B.

Figure 2A:
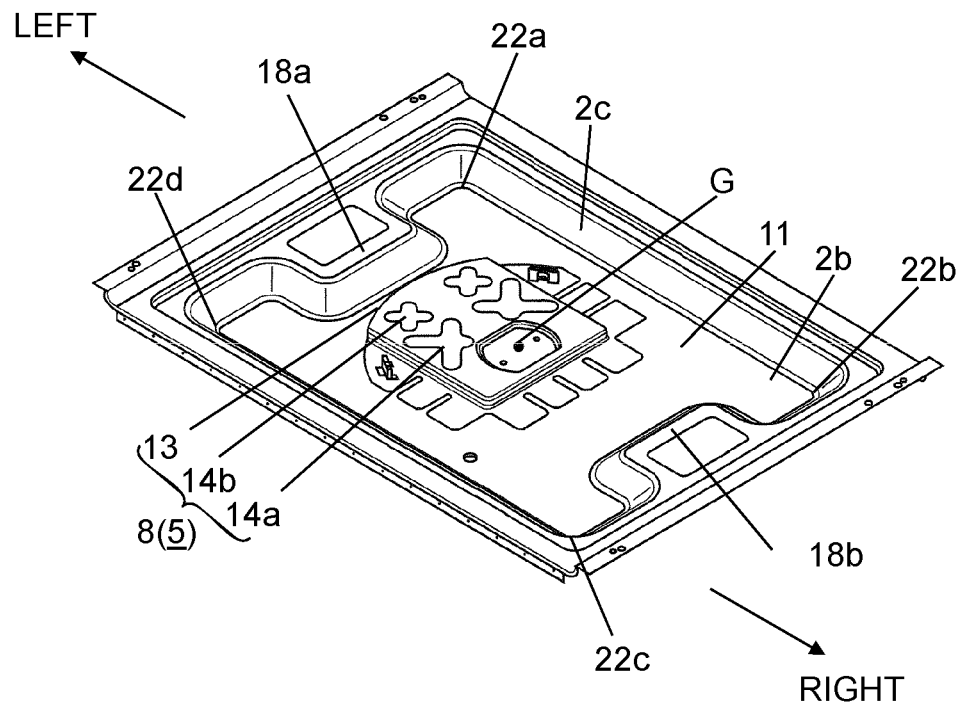
FIG. 2A is a perspective view of a power feeding chamber in a heating section of the microwave heating device according to this exemplary embodiment.

FIG. 2A is a perspective view of power feeding chamber 2b of heating chamber space 2 in which radiation antenna 5 is disposed. FIG. 2B is a plan view of power feeding chamber 2b in FIG. 2A. More specifically, FIG. 2A illustrates the bottom surface of heating chamber space 2 in a case where mounting table 6 is removed.

Figure 2B:
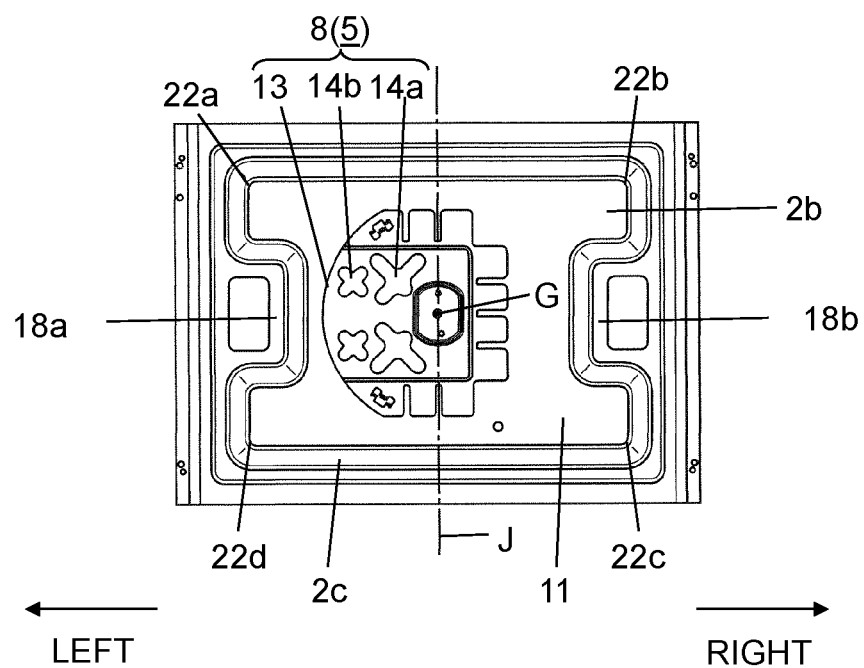
FIG. 2B is a plan view of the power feeding chamber in the heating section of the microwave heating device according to this exemplary embodiment.

As described above, power feeding chamber 2b illustrated in FIGS. 2A and 2B is disposed immediately below heating chamber 2a and is separated from heating chamber 2a by mounting table 6 (see FIG. 1).

Radiation antenna 5 is provided inside power feeding chamber 2b. More specifically, radiation antenna 5 is disposed with center of rotation G of coupling shaft 7a aligned with a substantially center of power feeding chamber 2b in the front-back and horizontal directions. Thus, center of rotation G is positioned, in the front-back and horizontal directions, immediately below (or below) the center of mounting table 6 that forms the bottom surface of heating chamber 2a.

Bottom surface 11 of power feeding chamber 2b and a lower surface of mounting table 6 define the power feeding space. This power feeding space is symmetric with respect to central line J (see FIG. 2B), which extends in the front-back direction of power feeding chamber 2b and contains center of rotation G of coupling part 7.

Formed in power feeding chamber 2b are projections 18a, 18b, each of which protrudes from bottom surface 11 toward the power feeding space. More specifically, projection 18a is formed on left side wall 2c so as to protrude from bottom surface 11. Likewise, projection 18b is formed on right side wall 2c so as to protrude from bottom surface 11. Magnetron 3 is disposed under projection 18b. In short, projection 18b is provided to reserve a space in which magnetron 3 is disposed.

The microwave radiated from output end 3a (see FIG. 1) of magnetron 3 propagates inside waveguide 4 disposed immediately below power feeding chamber 2b. Then, this microwave is led to waveguide structure 8 via coupling part 7 of radiation antenna 5. The microwave is thereby radiated to within power feeding chamber 2b via open end 13, openings 14a, 14b, and other parts formed in waveguide structure 8 of radiation antenna 5.

Side walls 2c that are side walls enclosing the power feeding space of power feeding chamber 2b are formed as sloped surfaces. Each of these sloped surfaces is formed so as to be inclined upward, more specifically, so as to be widened outwardly toward heating chamber 2a. When radiation antenna 5 radiates a microwave horizontally from open end 13, for example, the microwave is reflected upward by the sloped surfaces of side walls 2c and propagates toward heating chamber 2a.

Power feeding chamber 2b is formed into a rectangular shape in planar view, and two of side walls 2c which have projections 18a, 18b extruding from bottom surface 11 are formed on the short sides (right and left sides in FIG. 2B) of the rectangular shape. Four corners of power feeding chamber 2b correspond to corners 22a, 22b, 22c, and 22d of power feeding chamber 2b. Thus, projection 18a is formed between corners 22a and 22d; projection 18b is formed between corners 22b and 22c of power feeding chamber 2b.

As described above, power feeding chamber 2b of microwave oven 1 is configured.

Figure 3A:
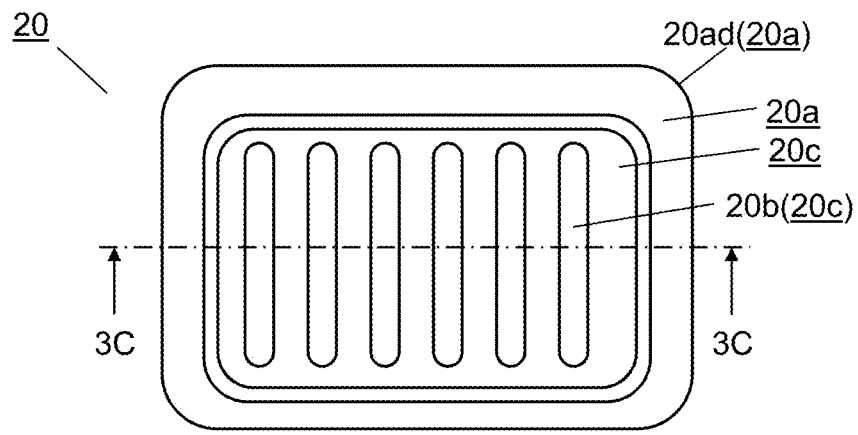
FIG. 3A is a plan view of a grill plate to be used in a grill mode.
Figure 3B:
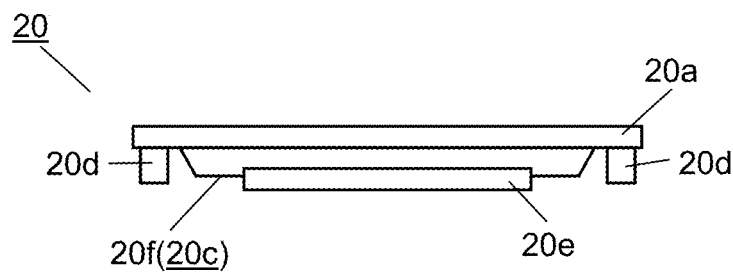
FIG. 3B is a side view of the grill plate to be used in the grill mode.
Figure 3C:
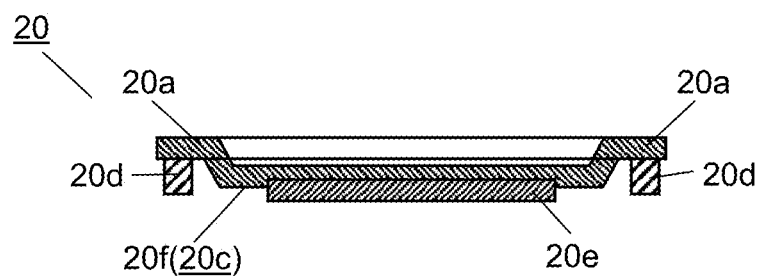
FIG. 3C is a longitudinal section view of the grill plate to be used in the grill mode.

With reference to FIGS. 3A to 3C, a configuration of grill plate 20 in microwave oven 1 will be described below.

FIG. 3A is a plan view of grill plate 20 as seen from the top. FIG. 3B is a side view of grill plate 20 as seen from one side. FIG. 3C illustrates a cross section taken along line 3C-3C in FIG. 3A.

As illustrated in FIGS. 3A to 3C, grill plate 20 includes: periphery 20a that takes the shape of a picture frame, for example; plate 20c; and insulating parts 20d. Plate 20c has a plurality of grooves 20b each of which has a predetermined depth. Grooves 20b are disposed side by side on the inner side of periphery 20a. It should be noted that grooves 20b are not illustrated in FIG. 3C. Insulating parts 20d are disposed under periphery 20a.

In a grill mode, details of which will be described later, object 21 to be heated is placed on plate 20c of grill plate 20, and then disposed inside heating chamber 2a and heated. More specifically, grill plate 20 is disposed inside heating chamber 2a with insulating parts 20d being in contact with the rails provided on right and left side walls 2d in heating chamber 2a.

Plate 20c is provided with microwave absorbing heat generator 20e (for example, ferrite) on its lower, outer surface (opposite facing mounting table 6). The lower, outer surface of plate 20c forms bottom surface 20f of grill plate 20.

In this way, grill plate 20 is configured.

Next, a description will be given of a function and effect of the microwave in the grill mode, which is a mode of heating object 21 placed on grill plate 20.

Periphery 20a and plate 20c of grill plate 20 are each made of a material, such as iron or aluminum, that does not transmit microwaves. Each insulating part 20d is made of an insulating material, such as polyphenylene sulfide (PPS) resin, that transmits microwaves. Insulating parts 20d insulate grill plate 20 from side walls 2d of heating chamber 2a.

When object 21 starts being heated in the grill mode, a microwave radiated from radiation antenna 5 propagates to bottom surface 20f of grill plate 20 configured above, as arrows E illustrated in FIG. 1. This microwave is absorbed by microwave absorbing heat generator 20e provided on bottom surface 20f, so that heat is generated in microwave absorbing heat generator 20e. The generated heat is transferred to bottom surface 20f of grill plate 20, so that bottom surface 20f is heated. In this way, object 21 on plate 20c of grill plate 20 is heated indirectly by the microwave.

As described above, periphery 20a and plate 20c of grill plate 20 are each made of a material that does not transmit microwaves. This means that object 21 is not heated by microwaves that have transmitted via periphery 20a and plate 20c of grill plate 20.

However, a gap that allows microwaves to pass therethrough is secured between side walls 2d of heating chamber 2a and grill plate 20. More specifically, the rails disposed on side walls 2d of heating chamber 2a are in contact with insulating parts 20d of grill plate 20. Each insulating part 20d is made of a material, such as PPS resin, that transmits microwaves. Therefore, the microwave propagates, via insulating parts 20d, between grill plate 20 and right side wall 2d of heating chamber 2a and between grill plate 20 and left side wall 2d.

Provided in front of grill plate 20 is a door (not illustrated) made of a glass plate, for example. This door is provided in a front opening of heating chamber 2a in an openable and closable manner. For example, the door includes: an outer conductive part made of an electromagnetically shielded perforated metal; and an inner glass plate which isolates inner heat from the outside and from which dust can be removed easily. When radiation antenna 5 radiates the microwave, part of this microwave passes through the glass plate in front of grill plate 20, then is reflected by the perforated metal, and goes into heating chamber 2a disposed over grill plate 20.

For example, side wall 2d of heating chamber 2a in rear of grill plate 20 may have projections. In this case, the microwave may propagate in gaps between the projections and go into heating chamber 2a disposed over grill plate 20.

As illustrated in FIG. 3A, periphery 20a of grill plate 20 is provided with corner parts 20ad, each of which has an arched shape. Therefore, gaps are reserved between corner parts 20ad and angled corners of square-shaped heating chamber 2a. Via these gaps, the microwave goes into heating chamber 2a disposed over grill plate 20.

The above configuration generates a microwave flow, as indicated by arrows F in FIG. 1. Along this microwave flow, the microwave goes into heating chamber 2a over grill plate 20 on which object 21 is placed, via the gaps, for example, between grill plate 20 and side walls 2d of heating chamber 2a. This microwave flow causes object 21 to be heated directly.

In the grill mode, which is a mode of heating object 21, as described above, the arrangement of FIG. 1 generates two, namely, first and second microwave flows. The first microwave flow, denoted by arrows E, causes object 21 to be heated indirectly, whereas the second microwave flow, denoted by arrows F, causes object 21 to be heated directly. In the grill mode, thus, the microwave propagates along the two microwave flows. Object 21 is thereby heated with the microwave radiated in different directions.

In this way, object 21 is heated both directly and indirectly with the microwave in the grill mode.

Next, with reference to FIG. 4, a description will be given of a method of controlling a rotation of radiation antenna 5 in such a way that microwave oven 1 configured above both improves heating efficiency and performs even heating.

In the present exemplary embodiment, controller 17 controls the rotation of radiation antenna 5, based on a detection signal, more specifically, the reflected wave detection amount from directional coupler 30 conceived of by the inventors of the present application.

The inventors of the present application have diligently studied a method of performing the heating control more appropriately in accordance with a state of object 21 to be heated. More specifically, the inventors of the present application have diligently studied a method of controlling the grill mode in which object 21 is heated and grilled on grill plate 20 disposed over mounting table 6. As a result of the study, the inventors of the present application have conceived of a method of controlling a direction in which radiation antenna 5 radiating a microwave faces (rotation angle of radiation antenna 5). This method makes it possible to heat object 21 with improved efficiency and evenly.

Figure 4:
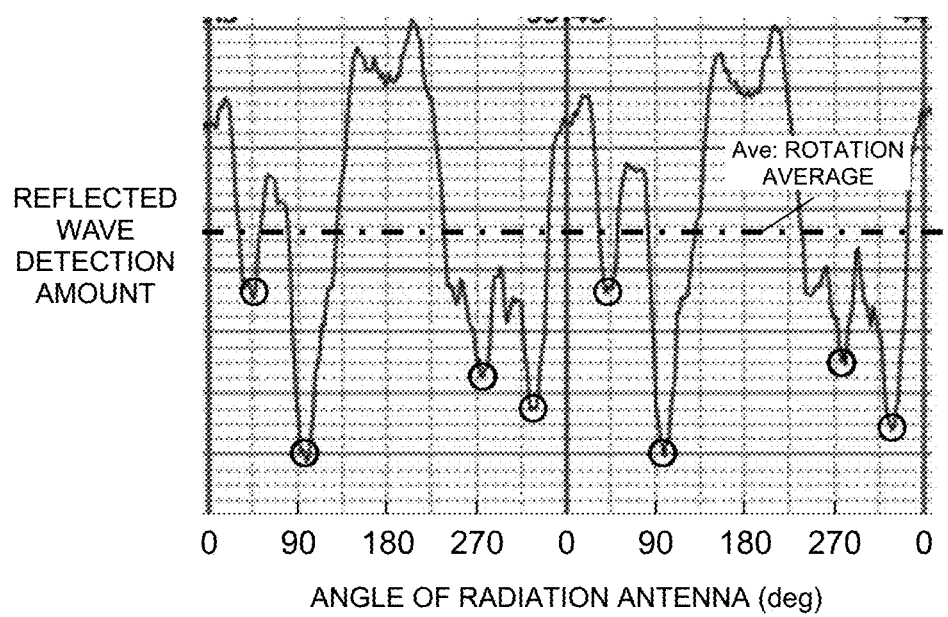
FIG. 4 illustrates a characteristic of a detection amount of a reflected wave in the microwave heating device according to this exemplary embodiment, in relation to an angle of a radiation antenna.

FIG. 4 illustrates a characteristic of the reflected wave detection amount detected by directional coupler 30 in microwave oven 1 configured as in FIGS. 1 to 3C, in relation to the angle of rotating radiation antenna 5.

In FIG. 4, a horizontal axis represents the angle of radiation antenna 5, namely, a direction in which open end 13 faces (rotation angle of open end 13). Further, an angle of radiation antenna 5 is set to 0 degrees when open end 13 faces in a direction from the front to rear of the door of microwave oven 1 (toward the opposite side of the door).

As illustrated in FIG. 4, the reflected wave detection amount is minimized when the rotation angle of radiation antenna 5 is 90 degrees. The reflected wave detection amount increases at rotation angles of 90 degrees, 315 degrees, 270 degrees, and 45 degrees in this order. All of these reflected wave detection amounts are smaller than rotation average Ave indicated by an alternate long and short dash line in FIG. 4.

To improve the heating efficiency, in general, it would be believed that radiation antenna 5 only has to radiate the microwave while stopping at a rotation angle of 90 degrees at which the reflected wave detection amount is minimized or at another angle at which the reflected wave detection amount is considerably small. In this case, however, uneven grilling (heating) is likely to occur, because the radiation with a highly efficient microwave distribution is fixed over a certain period of time. As a result, object 21 is heated efficiently but may be heated unevenly.

Figure 5:
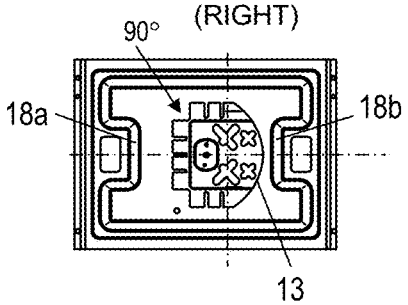
FIG. 5 illustrates a relationship between a direction in which the radiation antenna faces and a heat distribution of the grill plate, in the microwave heating device according to this exemplary embodiment.
Figure 5:
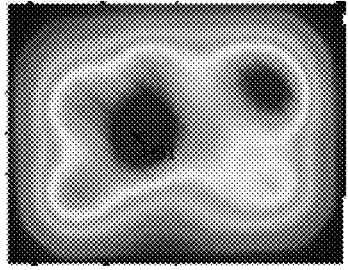
Figure 5:
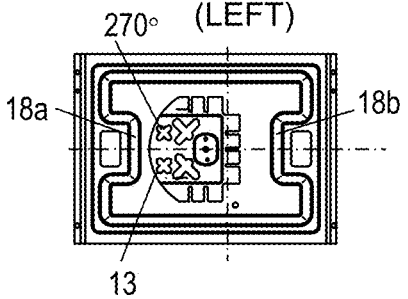
Figure 5:
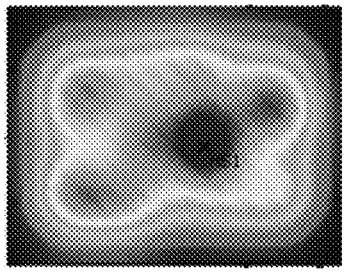
Figure 5:
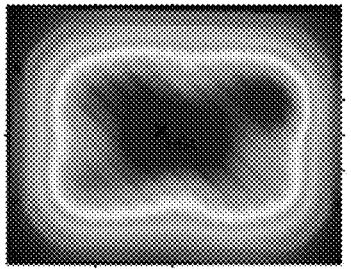

For the purpose of achieving even heating, the inventors of the present application have further studied a relationship between a direction in which open end 13 of radiation antenna 5 faces (rotation angle of open end 13) and an actual heat distribution of a grill plate. FIG. 5 illustrates the result.

FIG. 5 illustrates a relationship between a direction in which the radiation antenna faces and a heat distribution of the grill plate in the microwave heating device according to this exemplary embodiment.

As illustrated in the uppermost left part of FIG. 5, when the rotation angle of radiation antenna 5 is set to 90 degrees, open end 13 of radiation antenna 5 faces toward the right side inside power feeding chamber 2b. The uppermost right part of FIG. 5 illustrates the heat distribution of grill plate 20 obtained in this state. It can be found from this part that the region with the strongest heat distribution emerges on a little left side of the center.

As illustrated in the middle left part of FIG. 5, when the rotation angle of radiation antenna 5 is set to 270 degrees, open end 13 of radiation antenna 5 faces toward the left side inside power feeding chamber 2b. The middle right part of FIG. 5 illustrates the heat distribution of grill plate 20 obtained in this state. It can be found from this part that the region with the strongest heat distribution emerges on a little right side of the center.

In general, it would be believed that directivity of the radiated microwave is maximized in a direction in which open end 13 of radiation antenna 5 faces. Thus, it could be predicted that a region with the strongest heat distribution emerges in the direction in which open end 13 faces. However, the result obtained is opposite to this prediction, as illustrated in each right part of FIG. 5.

The inventors of the present application have further studied this result.

In the grill mode, when grill plate 20 is placed at a high level, radiation antenna 5 is distant (vertically) from grill plate 20. In this case, the microwave is radiated in a direction in which open end 13 faces and then reflected by projections 18a, 18b and side walls 2d of heating chamber space 2, for example. As a result, the microwave can concentrate on the opposite side, which then is heated.

However, the concentration of the microwave can depend on an angle of an inclined surface in front of open end 13 of radiation antenna 5, a shape of heating chamber space 2, a height of grill plate 20, and other factors. Thus, when grill plate 20 is placed at a high level, the microwave radiated from open end 13 is first reflected in accordance with an angle of an inclined surface in front of open end 13. Then, this microwave is reflected by corresponding side wall 2d of heating chamber space 2. As a result, the microwave can concentrate on and strike the opposite side of grill plate 20 placed at the high level. Therefore, when grill plate 20 is placed at a middle level, for example, the microwave can concentrate in the center of grill plate 20. When grill plate 20 is placed at a low level, for example, the microwave can concentrate on the side toward which open end 13 faces.

The above result also suggests that it is difficult to uniquely estimate an uneven heating state, as described above.

From the result illustrated in FIG. 5, however, the inventors of the present application have found the fact that the heat distribution obtained when the rotation angle of radiation antenna 5 is set to 90 degrees is substantially symmetrical to the heat distribution obtained when the rotation angle of radiation antenna 5 is set to 270 degrees, which is different from 90 degrees.

Obviously, as illustrated in the upper right part of FIG. 5, a highly colored region, namely, a region of a large heat amount becomes wider because the object is heated efficiently when the rotation angle is set to 90 degrees at which the reflected wave detection amount is minimized. Therefore, even if radiation antenna 5 stops for the same period and at different angles at which the radiation amount of the microwave becomes somewhat small as illustrated in FIG. 4, it may be difficult to prevent the uneven heating.

The inventors of the present application have conceived of a method of stopping radiation antenna 5 for a longer period when the rotation angle is set to 270 degrees than when the rotation angle is set to 90 degrees. The inventors of the present application have predicted that this method can mitigate uneven heating, because the heated states are mixed together.

More specifically, as illustrated in the lowermost left part of FIG. 5, the heating is performed in the grill mode under the rotation control in which radiation antenna 5 alternately stops at the rotation angle of 90 degrees for 10 seconds and at the rotation angle of 270 degrees for 15 seconds. The result demonstrates that it is possible to provide a highly even heat distribution of grill plate 20, as illustrated in the lowermost right part of FIG. 5.

In microwave oven 1 that serves as the microwave heating device according to the present exemplary embodiment, as described above, center of rotation G of radiation antenna 5 is substantially aligned with the center of power feeding chamber 2b in the front-back and horizontal directions. In addition, center of rotation G is positioned substantially immediately below the center of mounting table 6 in the front-back and horizontal directions. The power feeding space in power feeding chamber 2b is symmetric with respect to central line J (see FIG. 2B), which extends in the front-back direction inside power feeding chamber 2b and contains center of rotation G of coupling part 7. In view of the above, it is believed that radiation antenna 5 causes symmetrically uneven heating at the rotation angles of 90 degrees and 270 degrees.

According to the present exemplary embodiment, as described above, microwave oven 1 includes: heating chamber space 2 that accommodates object 21 to be heated; microwave generator 3 that generates a microwave to be supplied to heating chamber space 2; waveguide 4 through which the microwave generated by microwave generator 3 propagates to heating chamber space 2; and radiation antenna 5 that radiates the microwave propagating inside waveguide 4 to heating chamber space 2. Furthermore, microwave oven 1 includes: motor 15 that rotates radiation antenna 5; reflected wave detector (directional coupler) 30 that detects at least part of a reflected wave inside waveguide 4; and controller 17 that controls a direction in which radiation antenna 5 faces by controlling motor 15 based on a reflected wave detection amount detected by reflected wave detector 30. The controller 17 controls motor 15 so as to stop a rotation of radiation antenna 5 when radiation antenna 5 faces in a direction in which the reflected wave detection amount is minimized (for example, in a direction at an angle of 90 degrees) and when radiation antenna 5 faces in a different direction different from the direction in which the reflected wave detection amount is minimized (for example, in a direction at an angle of 270 degrees).

According to this configuration, first, radiation antenna 5 stops its rotation when facing in a direction in which the reflected wave detection amount is minimized. Object 21 is thereby heated for an extended period of time under the most efficient heating condition. As a result, the heating efficiency is improved in comparison with a case where heating is performed while radiation antenna 5 is rotating at a constant speed. Second, radiation antenna 5 stops its rotation when facing in the different direction different from the direction in which the reflected wave detection amount is minimized. In this case, the microwave radiated from radiation antenna 5 causes uneven heating when radiation antenna 5 stops while facing in the direction in which the reflected wave detection amount is minimized as well as when radiation antenna 5 stops while facing in the different direction. In this case, an effect of the uneven heating caused in relation to the direction in which the reflected wave detection amount is minimized is canceled out by an effect of the uneven heating caused in relation to the different direction. Consequently, it is possible to suppress uneven heating and thus provide even heating in comparison with the case where radiation antenna 5 stops only when facing in the direction in which the reflected wave detection amount is minimized. In other words, it is possible to both improve heating efficiency and perform even heating at the same time.

According to the present exemplary embodiment, controller 17 controls motor 15 so as to differently set a stop time of radiation antenna 5, depending on a direction in which radiation antenna 5 faces (a rotation angle of radiation antenna 5). Setting the stop time in this manner can appropriately change a distribution of the uneven heating caused when radiation antenna 5 stops while facing in the direction (for example, in the direction at an angle of 90 degrees) in which the reflected wave detection amount is minimized and when radiation antenna 5 stops while facing in the different direction (for example, in a direction at an angle of 270 degrees). Consequently, it is possible to, in addition to both improving the efficiency and performing the even heating, easily adjust, for example, which of the improved efficiency and the even heating is prioritized.

According to the present exemplary embodiment, controller 17 may control motor 15 so as to set the stop time (for example, 10 seconds) of radiation antenna 5 related to the direction (for example, the direction at an angle of 90 degrees) in which the reflected wave detection amount is minimized to be shorter than the stop time (for example, 15 seconds) in relation to the different direction (for example, the direction at an angle of 270 degrees). When radiation antenna 5 stops while facing in the direction in which the reflected wave detection amount is minimized, object 21 is heated with the highest efficiency. Thus, if a time over which radiation antenna 5 stops while facing in the direction (for example, in the direction at an angle of 90 degrees) in which the reflected wave detection amount is minimized is set to be the same as a time over which radiation antenna 5 stops while facing in the different direction (including a direction at an angle of 180 degrees), uneven heating may be more prominent. In contrast, when radiation antenna 5 stops while facing in the different direction, object 21 is heated with lower efficiency than when radiation antenna 5 stops while facing in the direction in which the reflected wave detection amount is minimized. Thus, when radiation antenna 5 faces in the different direction, the microwave radiated from radiation antenna 5 may cause somewhat slightly uneven heating of object 21. For this reason, when radiation antenna 5 faces in each of the different directions, controller 17 sets the stop time of radiation antenna 5 to be longer (more specifically, 10 seconds at an angle of 90 degrees and 15 seconds at an angle of 270 degrees). Setting the stop times in this manner can promote the uneven heating caused by the microwave radiated from radiation antenna 5 when radiation antenna 5 faces in the different direction. Consequently, it is possible to cancel out the effects of the uneven heating in balance. In this way, it is possible to both improve the efficiency and perform even heating at the same time while maintaining further even heating.

According to the present exemplary embodiment, in a case where radiation antenna 5 stops in the different directions at an N number of locations, controller 17 sets a reference direction of radiation antenna 5 to the direction in which the reflected wave detection amount is minimized (for example, the direction at an angle of 90 degrees), and controls motor 15 so as to, first, stop radiation antenna 5 when radiation antenna 5 faces in the reference direction and then sequentially stop radiation antenna 5 whenever radiation antenna 5 rotates by (360/(N+1)) degrees.

In this configuration, if object 21 to be heated is small in size or resists uneven heating according to a menu, N denoting the number of different directions is set to 1, for example. Setting N in this manner can increase the proportion of the direction in which the reflected wave detection amount is minimized, namely, in which the heating is performed with the highest efficiency, thereby performing the heating with preferentially improved heating efficiency. If object 21 to be heated is large in size or subject to uneven heating according to a menu, N denoting the number of different directions is set to 3, for example. Setting N in this manner can increase the proportions of the different directions, thereby maintaining even heating preferentially, and moreover can easily adjust the priority orders of an improvement of the efficiency and the maintenance of even heating.

It should be noted that the present exemplary embodiment provides sufficiently even heating even when the number of different directions is set to 1. Therefore, controller 17 controls motor 15 so as to stop the rotation of radiation antenna 5 when radiation antenna 5 faces in the direction in which the reflected wave detection amount is minimized (for example, in the direction at an angle of 90 degrees) and so as to stop the rotation of radiation antenna 5 when radiation antenna 5 faces in a different direction obtained by rotating radiation antenna 5 by 180 degrees (for example, in the direction at an angle of 270 degrees). In this way, it is possible to make an adjustment with an improvement in the heating efficiency prioritized most strongly, in comparison with the case where radiation antenna 5 stops at the different directions of two or more different preset locations.

Second Exemplary Embodiment

Figure 6:
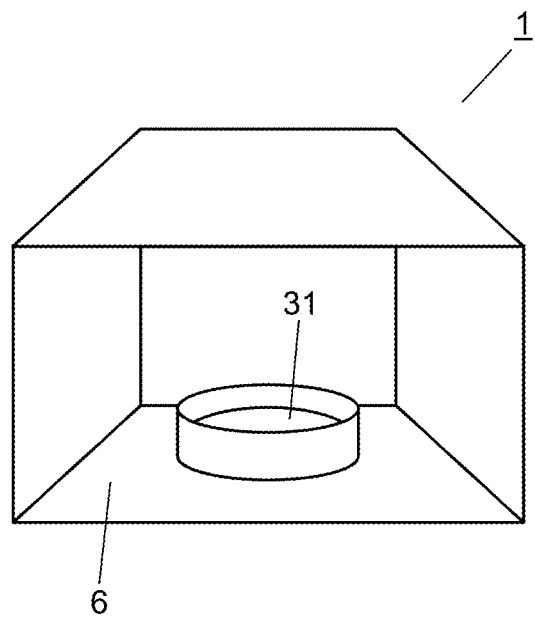
FIG. 6 is a front perspective view of a schematic configuration of a microwave heating device according to a second exemplary embodiment of the present invention in a case where its door is removed.

With reference to FIG. 6, a description will be given below of a microwave heating device according to a second exemplary embodiment of the present invention.

FIG. 6 is a schematic configuration of microwave oven 1, which serves as a microwave heating device according to the second exemplary embodiment of the present invention. More specifically, FIG. 6 is a perspective view of microwave oven 1 as seen from the front.

As illustrated in FIG. 6, microwave oven 1 according to the present exemplary embodiment differs from microwave oven 1 according to the foregoing first exemplary embodiment in that object 31 to be heated is placed directly on mounting table 6 without using a grill plate and then is heated in a "warming mode", for example. However, a basic configuration of microwave oven 1 is substantially the same as the configuration of microwave oven 1 according the first exemplary embodiment. Therefore, constituent elements substantially identical to the constituent elements of the first exemplary embodiment are denoted by the identical reference marks and their detailed description will be omitted.

In microwave oven 1 according to the present exemplary embodiment, object 31 to be heated, such as a food, has a considerably large size and is placed directly on mounting table 6 while disposed in a container having a diameter about 150 mm, for example. Then, microwave oven 1 is set to the "warming mode" and heats object 31 with a microwave radiated from magnetron 3.

In the "warming mode", object 31 to be heated is placed directly on mounting table 6. In this case, object 31 is placed close to radiation antenna 5 disposed immediately below mounting table 6. Therefore, most of the microwave from radiation antenna 5 directly strikes object 31. As a result, a portion of object 31 positioned closer to directivity of radiation antenna 5 is heated more strongly.

Because of the configuration in which object 31 to be heated is placed, microwave oven 1 needs to perform control that differs from the heating control in the grill mode according to the first exemplary embodiment.

For the above reason, a description will be given of a method of controlling a rotation of radiation antenna 5 by which object 31 placed inside microwave oven 1 in the above manner is heated evenly and efficiently, with reference to FIG. 7.

Figure 7:
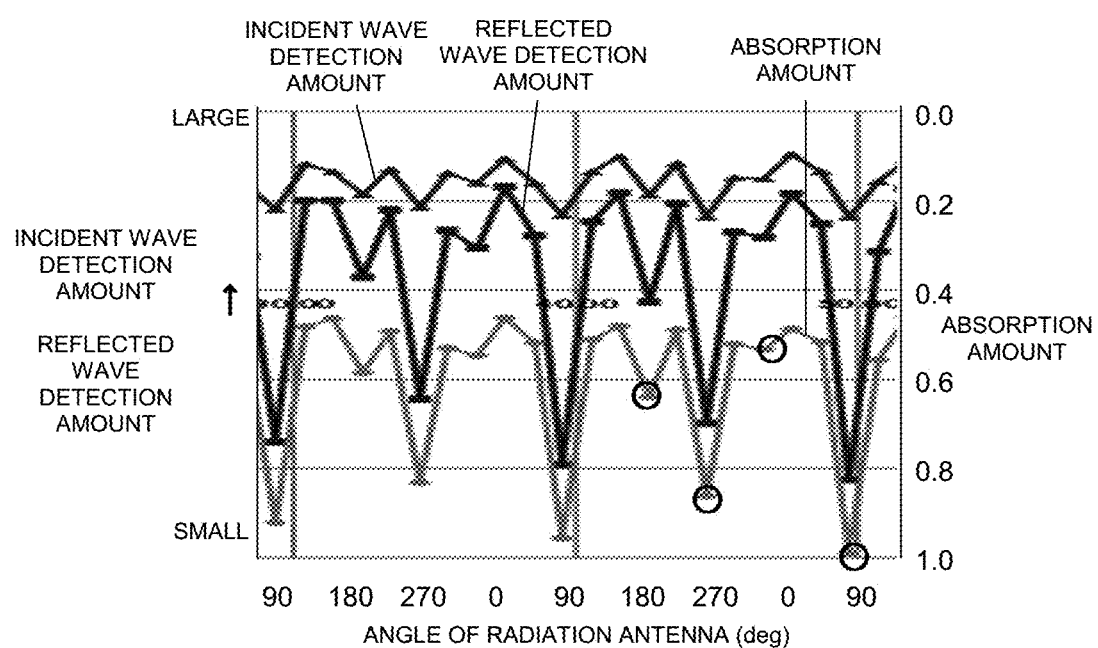
FIG. 7 illustrates characteristics of detection amounts of incident and reflected waves and an absorption amount, in relation to an angle of a radiation antenna according to this exemplary embodiment.

FIG. 7 illustrates characteristics of incident and reflected wave detection amounts and an absorption amount detected by directional coupler 30 in microwave oven 1 illustrated in FIG. 6, in relation to the angle of rotating radiation antenna 5.

In FIG. 7, a horizontal axis represents the angle of radiation antenna 5, namely, an angle (rotation angle) of open end 13. Further, an angle of radiation antenna 5 is set to 0 degrees when open end 13 faces in a direction from the front to rear of the door of microwave oven 1 (toward the opposite side of the door). In FIG. 7, a left vertical axis represents incident and reflected wave detection amounts. Both of the incident and reflected wave detection amounts become larger toward the top and smaller toward the bottom.

In FIG. 7, a right vertical axis represents an absorption amount (the amount of the microwave actually absorbed by object 31), which is calculated from the incident and reflected wave detection amounts. The absorption amount becomes smaller toward the top and larger toward the bottom. This absorption amount is represented in percentage terms and set to 1 when the angle of radiation antenna 5 is 90 degrees on the right side of FIG. 7.

As can be seen from the absorption amount of the microwave indicated in FIG. 7, the heating efficiency improves when radiation antenna 5 stops its rotation at 90 degrees. In this case, however, uneven grilling (heating) is likely to occur, because the radiation with a highly efficient microwave distribution is fixed over a certain period of time. As a result, object 31 may be heated with an improved efficiency but unevenly.

For the purpose of achieving even heating, the inventors of the present application have studied a relationship between a direction in which open end 13 of radiation antenna 5 faces (the rotation angle of open end 13) and a heated area of object 31 placed on mounting table 6. FIG. 8 illustrates the result.

FIG. 8 illustrates the relationship between the direction in which radiation antenna 5 faces and the heated area of object 31 to be heated.

In the present exemplary embodiment, as described above, microwave oven 1 heats object 31 in the "warming mode". In this case, most of the microwave radiated from radiation antenna 5 is expected to strike object 31 directly.

FIG. 8 indicates that a portion of object 31 positioned closer to the directivity of radiation antenna 5 is heated more strongly, as expected.

As illustrated in the uppermost left part of FIG. 8, when the rotation angle of radiation antenna 5 is set to 0 degrees, open end 13 of radiation antenna 5 faces toward the rear side inside power feeding chamber 2b. In this case, as illustrated in the uppermost right part of FIG. 8, strongly heated area 32a emerges on the rear periphery of object 31.

As illustrated in the upper left part of FIG. 8, when the rotation angle of radiation antenna 5 is set to 90 degrees, open end 13 of radiation antenna 5 faces toward the right side inside power feeding chamber 2b. In this case, as illustrated in the upper right part of FIG. 8, strongly heated area 32b emerges on the right periphery of object 31.

As illustrated in the lower left part of FIG. 8, when the rotation angle of radiation antenna 5 is set to 180 degrees, open end 13 of radiation antenna 5 faces toward the front side inside power feeding chamber 2b. In this case, as illustrated in the lower right part of FIG. 8, strongly heated area 32c emerges on the front periphery of object 31.

As illustrated in the lowermost left part of FIG. 8, when the rotation angle of radiation antenna 5 is set to 270 degrees, open end 13 of radiation antenna 5 faces toward the left side inside power feeding chamber 2b. In this case, as illustrated in the lowermost right part of FIG. 8, strongly heated area 32d emerges on the left periphery of object 31.

From the above result, the inventors of the present application have noted the fact that four strongly heated areas 32a, 32b, 32c, and 32d emerge at substantially the same location as the four different locations of radiation antenna 5 at angles of 0 degrees, 90 degrees, 180 degrees, and 270 degrees.

In addition, FIG. 7 indicates that the absorption amount of the microwave varies depending on the direction in which radiation antenna 5 faces.

More specifically, FIG. 7 indicates the relationship of the amount of the microwave absorbed by object 31. The relationship is established as follows: the absorption amount 1.0 at 90 degrees of radiation antenna 5>the absorption amount 0.86 at 270 degrees>the absorption amount 0.63 at 180 degrees>the absorption amount 0.52 at 0 degrees. Therefore, when radiation antenna 5 stops at the above angles for the same time, the heating of object 31 caused when radiation antenna 5 faces in the direction in which a large amount of microwave is absorbed (for example, in the direction at an angle of 0 degrees) is dominant.

To heat object 31 evenly, in the present exemplary embodiment, controller 17 controls the rotation of radiation antenna 5 so as to stop for a longer time in a direction in which the above absorption amount is smaller. In other words, controller 17 performs the control so that, when radiation antenna 5 stops while facing in the four directions illustrated in FIG. 8, the absorbed energies, which will be described below, becomes equal to one another.

Specifically, controller 17 calculates stop times of radiation antenna 5 in relation to the respective directions so that individual values of the products of the absorption amounts and the stop times, which are equivalent to the energies of the microwave absorbed, becomes equal to one another.

In FIG. 8, controller 17 calculates the individual stop times so that the products of the absorption amounts and the stop times each becomes five. In other words, controller 17 calculates the stop times in relation to the directions of radiation antenna 5 at the four locations by using the equation: stop time=5/absorption amount. FIG. 8 indicates the calculation result in which the stop time when the angle of radiation antenna 5 is set to 90 degrees is 5 seconds, the stop time at 270 degrees is 6 seconds, the stop time at 180 degrees is 8 seconds, and the stop time at 0 degrees is 10 seconds. As can be seen from the result in FIG. 8, the heated strengths (sizes) of heated areas 32a, 32b, 32c, and 32d in relation to the directions of radiation antenna 5 at the four locations become substantially equal to one another.

Then, controller 17 sums the heating strengths of the heated areas at the four locations, for example, in relation to the directions of radiation antenna 5. As a result, even when object 31 is placed directly on mounting table 6, object 31 can be heated evenly without a minimal risk of being heated unevenly, as in the grill mode.

According to the present exemplary embodiment, as described above, microwave oven 1 includes: heating chamber 2a that accommodates object 31 to be heated; magnetron 3 that generates a microwave to be supplied to heating chamber 2a; waveguide 4 through which the microwave generated by magnetron 3 propagates to heating chamber 2a; and radiation antenna 5 that radiates the microwave propagating inside waveguide 4 to heating chamber 2a. Furthermore, microwave oven 1 includes: motor 15 that rotates radiation antenna 5; directional coupler 30 that detects at least part of a reflected wave inside waveguide 4; and controller 17 that controls a direction in which radiation antenna 5 faces by controlling motor 15 based on a reflected wave detection amount detected by directional coupler 30. Controller 17 controls motor 15 so as to stop a rotation of radiation antenna 5 when radiation antenna 5 faces in a direction in which the reflected wave detection amount is minimized (for example, in a direction at an angle of 90 degrees) and when radiation antenna 5 faces in a plurality of different directions (for example, in directions at angles of 0 degrees, 180 degrees, and 270 degrees).

According to this configuration, first, radiation antenna 5 stops its rotation when facing in a direction in which the reflected wave detection amount is minimized. Object 31 is thereby heated for an extended period of time under the most efficient heating condition. As a result, the heating efficiency is improved in comparison with a case where heating is performed while radiation antenna 5 is rotating at a constant speed. Second, radiation antenna 5 stops its rotation when facing in the three different directions different from the direction in which the reflected wave detection amount is minimized. When radiation antenna 5 stops while facing in the direction in which the reflected wave detection amount is minimized as well as in the three different directions, the microwave radiated from radiation antenna 5 causes uneven heating. In this case, an effect of the uneven heating caused in relation to the direction in which the reflected wave detection amount is minimized is canceled out by effects of the uneven heating caused in relation to the three different directions. Consequently, it is possible to suppress uneven heating and thus provide even heating in comparison with the case where radiation antenna 5 stops only when facing in the direction in which the reflected wave detection amount is minimized. In other words, it is possible to both improve heating efficiency and perform even heating at the same time.

According to the present exemplary embodiment, controller 17 may control motor 15 so as to set the stop time of radiation antenna 5 related to the direction in which the reflected wave detection amount is minimized (for example, the direction at an angle of 90 degrees) to be shorter than the stop time related to any of the different directions (for example, any of the directions at angles of 0 degrees, 180 degrees, and 270 degrees). When radiation antenna 5 stops while facing in the direction in which the reflected wave detection amount is minimized, object 31 is heated with the highest efficiency. Thus, if a time over which radiation antenna 5 stops while facing in the direction in which the reflected wave detection amount is minimized is set to be the same as a time over which radiation antenna 5 stops while facing in any of the different directions, uneven heating may be more prominent. In contrast, when radiation antenna 5 stops while facing in each of the different directions, object 31 is heated with lower efficiency than when radiation antenna 5 stops while facing in the direction in which the reflected wave detection amount is minimized. Thus, when radiation antenna 5 faces in each of the different directions, the microwave radiated from radiation antenna 5 causes somewhat slightly uneven heating of object 31. For this reason, controller 17 sets the time over which radiation antenna 5 stops while facing in each of the different directions to be longer. Setting the stop times in this manner can promote the uneven heating caused by the microwave radiated from radiation antenna 5 when radiation antenna 5 faces in the different directions. Consequently, it is possible to cancel out the effects of the uneven heating in balance. In this way, it is possible to both improve the heating efficiency and perform even heating at the same time while maintaining further even heating.

According to the present exemplary embodiment, microwave oven 1 further includes an incident wave detector that detects at least part of the incident wave inside waveguide 4. From incident and reflected wave detection amounts related to a plurality of directions (for example, at angles of 90 degrees, 0 degrees, 180 degrees, and 270 degrees) in which radiation antenna 5 stops to face, controller 17 calculates amounts of the microwave absorbed by object 31. Then, controller 17 may control motor 15 so as to equalize the products of the calculated absorption amounts and the stop times at the respective stop locations (in the present exemplary embodiment, for example, so as to set these products to five).

With this configuration, the products of the absorption amounts and the stop times are each equivalent to absorption energy absorbed by object 31. Therefore, controller 17 equalizes the absorption energies that cause uneven heating in relation to the direction in which the reflected wave detection amount is minimized (for example, in the direction at an angle of 90 degrees) and in relation to the different directions (for example, in the directions at angles of 0 degrees, 180 degrees, and 270 degrees). In this way, it is possible to cancel out the effects of the individual uneven heating in best balance. Consequently, it is possible to both improve the efficiency and perform even heating at the same time while maximally maintaining the even heating.

According to the present exemplary embodiment, in a case where radiation antenna 5 stops in the different directions at an N number of locations, controller 17 may set a reference direction of radiation antenna 5 to the direction in which the reflected wave detection amount is minimized (for example, the direction at an angle of 90 degrees), and control motor 15 so as to, first, stop the rotation of radiation antenna 5 when radiation antenna 5 faces in the reference direction and then sequentially stop the rotation of radiation antenna 5 whenever radiation antenna 5 rotates by (360/(N+1)) degrees.

In this configuration, if object 31 to be heated is small in size or resists uneven heating according to a menu, N denoting the number of different directions is set to 1, for example. Setting N in this manner can increase the proportion of the direction in which the reflected wave detection amount is minimized, namely, in which the heating is performed with the highest efficiency, thereby performing the heating with preferentially improved heating efficiency. If object 31 to be heated is large in size or subject to uneven heating according to a menu, N denoting the number of different directions is set to 3, for example. Setting N in this manner can increase the proportions of the different directions, thereby maintaining even heating preferentially, and moreover can easily adjust the priority orders of an improvement of the efficiency and the maintenance of even heating.

In the above description, object 31 that has a diameter of about 150 mm, namely, a large area and thus is subject to uneven heating is used as an example on a menu. More specifically, in an example configuration, the number N of different locations is set to 3, and the rotation of radiation antenna 5 stops at angles of 0 degrees, 180 degrees, and 270 degrees in addition to 90 degrees. Thus, this example configuration preferentially improves an even heating performance and sacrifices the heating efficiency to some extent.

In each of the exemplary embodiments described above, as an example, the rotation of radiation antenna 5 stops for a preset period of time; however, the present invention is not limited to this configuration. As an alternative example, radiation antenna 5 does not necessarily have to stop completely. More specifically, radiation antenna 5 only has to face in a preset direction for a long time, in comparison with the configuration in which radiation antenna 5 rotates at a constant speed. As an example, radiation antenna 5 may rotate at a lower speed when facing in a preset direction, thereby increasing the time. As another example, a reference direction may be set to a given direction, and radiation antenna 5 may rotate in the forward and reverse directions within a narrow angle range, thereby increasing the time.

In each of the exemplary embodiments described above, as an example, an angle at which radiation antenna 5 stops is set to a target angle precisely, such as 90 degrees sharp; however, the present invention is not limited to this configuration. As an alternative example, radiation antenna 5 may stop at an angle shifted from 90 degrees in a range from −10 degrees to +10 degrees. A reason is that motor 15 typically engages with radiation antenna 5 with some margin therebetween. In this case, motor 15 is rotatable both clockwise and counterclockwise, especially in a case where motor 15 is a stepping motor. Therefore, if controller 17 controls radiation antenna 5 so as to stop at a target angle, an angle of radiation antenna 5 may be shifted easily from the target angle by 10 degrees or so, depending on its rotation direction and the margin.

[Detailed Description of Directional Coupler]

With reference to FIGS. 9 to 12, a description will be given below in detail of a configuration and operation of the directional coupler according to the above exemplary embodiments.

As described above, the components of the directional coupler are the reflected wave detector and the incident wave detector; the reflected wave detector detects at least part of the reflected wave of the microwave propagating inside waveguide 40, and the incident wave detector detects at least part of the incident (progressive) wave inside wave guide 40.

Figure 9:
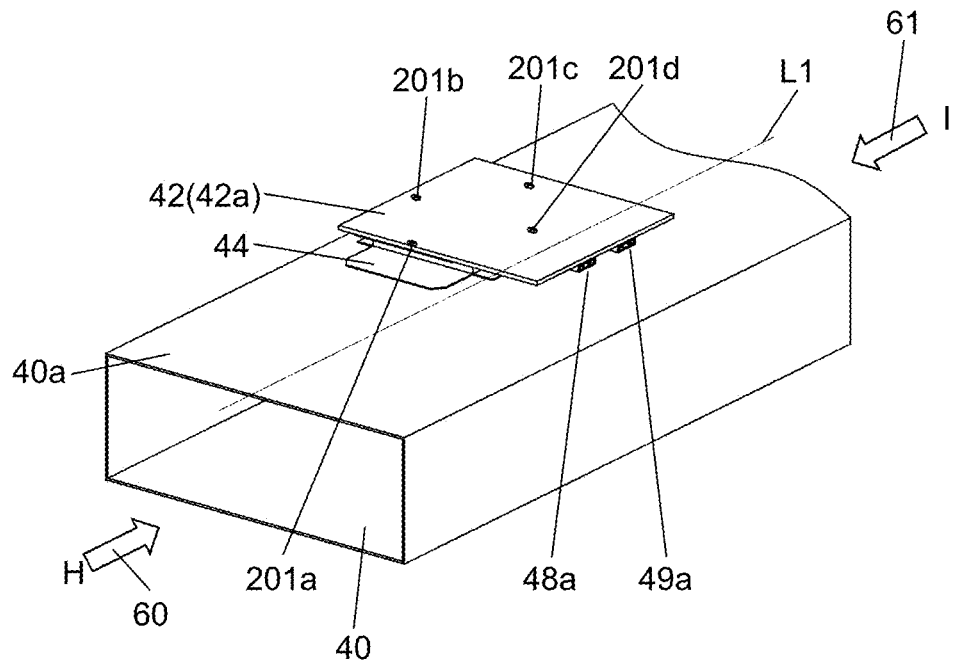
FIG. 9 is a perspective view of a directional coupler according to an exemplary embodiment of the present invention.
Figure 10:
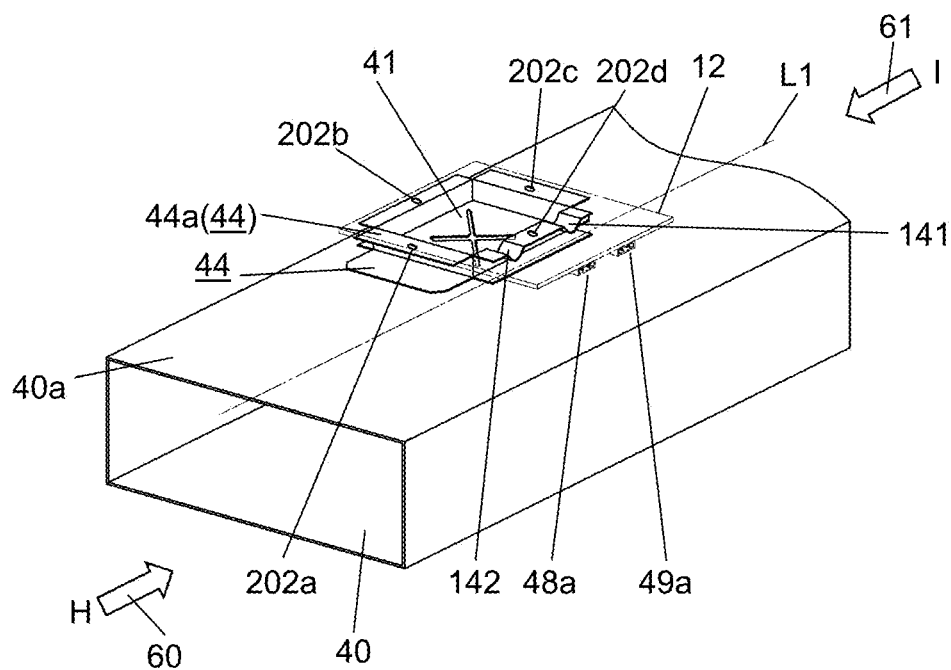
FIG. 10 is a perspective view of the directional coupler in FIG. 9 in a case where its printed circuit board is illustrated in a transparent manner.
Figure 11:
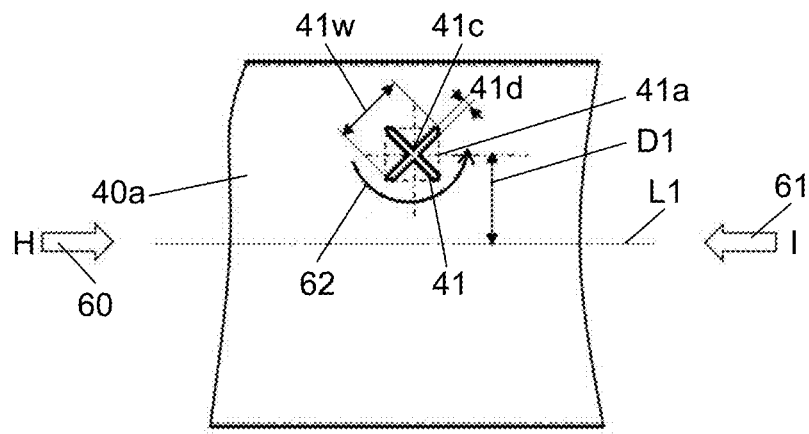
FIG. 11 illustrates a configuration of a cross opening in the directional coupler in FIG. 9.
Figure 12:
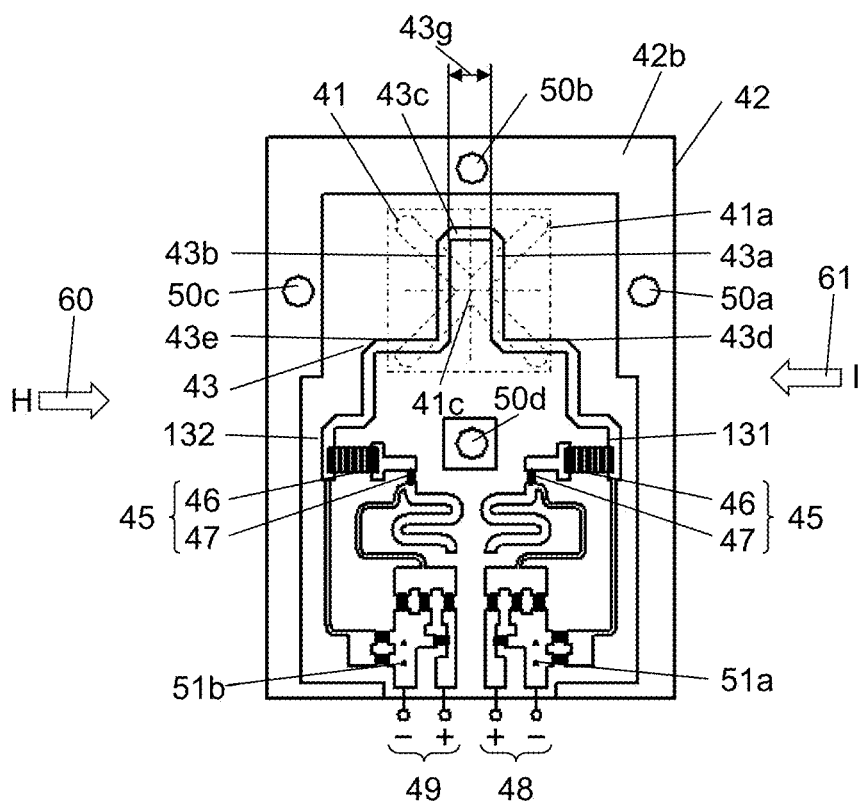
FIG. 12 illustrates a circuit configuration of the printed circuit board in the directional coupler in FIG. 9.

FIG. 9 is a perspective view of the directional coupler. FIG. 10 is a perspective view of the directional coupler in FIG. 9 in the case where its printed circuit board is illustrated in a transparent manner. FIG. 11 illustrates a configuration of a cross opening in the waveguide of the directional coupler in FIG. 9. FIG. 12 illustrates a circuit configuration of the printed circuit board in the directional coupler in FIG. 9.

As illustrated in FIGS. 9 to 12, directional coupler 30 includes: cross opening 41 having an X shape which is provided in wide surface 40a of waveguide 40; microstrip line 43 formed on printed circuit board 42; and support part 44. Printed circuit board 42 is provided on the exterior of waveguide 40 so as to face cross opening 41. Microstrip line 43, which has a predetermined line shape, is formed in a region of printed circuit board 42 which faces cross opening region 41a (see FIG. 11). When viewed in a direction from printed circuit board 42 to cross opening 41, cross opening region 41a is a region which is defined on a surface of printed circuit board 42 opposite cross opening 41 and in which an opening of cross opening 41 is present.

Support part 44 supports printed circuit board 42 and fixes printed circuit board 42 to the exterior of waveguide 40 on the wide surface 40a side. Support part 44, which is made of an insulating material, traps the microwave that would be radiated from cross opening 41 of waveguide 40, thereby shielding the microwave that would be radiated from waveguide 40 to the outside.

Cross opening 41 is an X-shaped opening, for example, that has central opening part 41c as its base point. As illustrated in FIG. 11, cross opening 41 is provided in wide surface 40a of waveguide 40 and is positioned so as not to intersect tube axis L1 of waveguide 40. Central opening part 41c of cross opening 41 is positioned away from tube axis L1 of waveguide 40 by a distance corresponding to dimension D1. For example, dimension D1 may be ¼ of the width of waveguide 40.

The opening shape of cross opening 41 depends on a width and height of waveguide 40, a power level and frequency band of the microwave propagating inside waveguide 40, a power level of the microwave radiated from cross opening 41, and other factors. For example, in a case where the width and height of waveguide 40 are 100 mm and 30 mm, respectively, a thickness of wall surfaces of waveguide 40 is 0.6 mm, the maximum power level and frequency band of the microwave propagating inside waveguide 40 are 1000 W and 2450 MHz, respectively, and the maximum power level of the microwave radiated from cross opening 41 is about 10 mW, cross opening 41 may be formed such that length 41w and width 41d are about 20 mm and 2 mm, respectively.

In FIG. 11, as an example, cross opening 41 has an X shape with its cross angle set to about 90 degrees; however, the present invention is not limited to this example. As an alternative example, the cross angle may be set to 60 degrees or 120 degrees.

If cross opening 41 is formed with central opening part 41c positioned on tube axis L1 of waveguide 40, an electric field generated by the microwave does not rotate but reciprocates in the propagating directions. In this case, a linearly polarized wave is radiated from cross opening 41.

If central opening part 41c is displaced from tube axis L1, the electric field rotates. However, as central opening part 41c is positioned closer to tube axis L1 (D1 is closer to 0 mm), the rotation of the electric field tends to be more misshapen. In this case, an elliptically polarized wave is radiated from cross opening 41.

In the present exemplary embodiment, dimension D1 is set to about ¼ of the width of waveguide 40. Setting dimension D1 in this manner enables the electric field to rotate in a substantially (subsuming completely) perfect circular fashion. As a result, the circularly polarized wave is radiated from cross opening 41 while rotating in a substantially perfectly circular fashion. In which case, the rotation direction of the electric field is definite. Thus, it is possible to precisely separate the progressive and reflected waves propagating inside waveguide 40 from each other. Therefore, directional coupler 30 can detect the progressive and reflected waves precisely.

For example, a copper foil is bonded to entire A-sided printed circuit board 42a of printed circuit board 42 which does not face cross opening 41 to form a microwave reflecting member. This microwave reflecting member prevents the circularly polarized wave radiated from cross opening 41 from passing through printed circuit board 42.

B-sided printed circuit board 42b of printed circuit board 42 which faces cross opening 41 is provided with microstrip line 43 as illustrated in FIG. 12. Microstrip line 43 is, for example, a transmission line having a characteristic impedance of a substantially (subsuming just) 50 ohms. Microstrip line 43 is disposed so as to surround central opening part 41c of cross opening 41 when viewed in a direction from printed circuit board 42 to cross opening 41. In other words, central opening part 41c of cross opening 41 is surrounded by lines of microstrip line 43 when viewed in the above direction.

Microstrip line 43 includes first line 43a and second line 43b that are formed at least substantially (subsuming completely) vertically to tube axis L1 of waveguide 40. In planar view, both first line 43a and second line 43b face cross opening region 41a in which cross opening 41 is present and are disposed on both sides of central opening part 41c of cross opening 41.

First ends of first line 43a and second line 43b are connected to third line 43c formed substantially (subsuming completely) parallel to tube axis L1 of waveguide 40. First line 43a, second line 43b, and third line 43c are formed so as to surround central opening part 41c of cross opening 41. Second ends of first line 43a and second line 43b are connected to first ends of lines 43d and 43e formed substantially (subsuming completely) parallel to tube axis L1, and lines 43d and 43e extend to the outside of cross opening region 41a.

Lines that extend from second ends of lines 43d and 43e to output sections 131, 132 of microstrip line 43 are formed through microstrip line 43, in accordance with locations of output sections disposed. In this case, output sections 131, 132 are formed outside support part 44.

Output sections 131, 132 provided at both ends of microstrip line 43 are connected to detection circuits 45. Each detection circuit 45 includes a processing circuit that handles the level of a detected microwave as a control signal.

As illustrated in FIG. 12, each detection circuit 45 includes chip resistor 46 and Schottky diode 47. A microwave signal at output section 131 is rectified through corresponding detection circuit 45. The rectified microwave signal is converted into a direct-current (DC) voltage through a smoothing circuit that includes a chip resistor and a chip capacitor, for example. The converted DC voltage is output to detected wave output section 48. Likewise, a microwave signal at output section 132 is also converted into a DC voltage through a circuit similar to the above and output to detected wave output section 49.

Formed around printed circuit board mounting holes 50a, 50b, 50c, 50d and pinholes 51a, 51b in B-sided printed circuit board 42b facing cross opening 41 are copper foils to be used as ground planes. Each of regions formed by the copper foils has the same potential as A-sided printed circuit board 42a of printed circuit board 42 which does not face cross opening 41.

Printed circuit board 42 is assembled and fixed to support part 44 by passing screws 201a, 201b, 201c, and 201d into printed circuit board mounting holes 50a, 50b, 50c, and 50d. As illustrated in FIG. 10, flange surfaces 44a of support part 44 are provided with projecting screw parts 202a, 202b, 202c, 202d that assemble and fix screws 201a, 201b, 201c, and 201d.

Furthermore, as illustrated in FIG. 10, support part 44 is provided with extraction sections 141, 142. Extraction sections 141, 142 allow the microwave propagating along microstrip line 43 to be delivered to output sections 131, 132 disposed outside support part 44 and extracted from output sections 131, 132. Each of extraction sections 141, 142 is formed by drawing, for example, in a direction away from printed circuit board 42, corresponding one of flange surfaces 44a of support part 44 through which printed circuit board 42 is assembled on support part 44 by a screw. Forming extraction sections 141, 142 in this manner prevents support part 44 from affecting the propagation of the microwave along microstrip line 43.

FIGS. 9 and 10 illustrate connectors 48a, 49a mounted on detected wave output sections 48, 49 illustrated in FIG. 12.

In the above description, as an example, the directional coupler in FIGS. 9 to 12 detects the microwave propagating in two directions inside waveguide 40; however, the present invention is not limited to this configuration. As an alternative example, the directional coupler may detect the microwave propagating in only one of the directions inside waveguide 40. In this configuration, detection circuit 45 illustrated in FIG. 12 may be replaced with a termination circuit (not illustrated). This termination circuit may include a chip resistor having a resistance value of 50 ohms.

Next, a description will be given of an operation and effect of the directional coupler configured above.

A ratio of the power of the microwave radiated from cross opening 41 having an X shape to the power of the microwave propagating inside waveguide 40 depends on dimensional sizes of the waveguide and the cross opening. More specifically, in a case where the waveguide and the cross opening have the dimensional sizes described above, the power ratio becomes about 1/100,000 (about −50 dB).

In FIGS. 9 to 12, arrow H denotes an incident wave (or progressive wave, referred to below as progressive wave 60) of a propagating microwave. Arrow I denotes a reflected wave (referred to below as reflected wave 61). In this case, as described above, when propagating inside waveguide 40 in the above manner, progressive wave 60 is sequentially excited by two openings that are formed in a direction of length 41w and constitute cross opening 41. Then, the microwave turns into a circularly polarized wave performing counterclockwise rotating radiation 62 (see FIG. 11) and is radiated to the outside of waveguide 40 via cross opening 41. Likewise, reflected wave 61 turns into a circularly polarized wave that is radiated while rotating clockwise and then is radiated to the outside of waveguide 40.

After rotationally radiated, the microwave of the circularly polarized waves is coupled to microstrip line 43 opposite cross opening 41. In this case, the microwave is radiated from cross opening 41 by progressive wave 60 propagating in the direction of arrow H is output to both output sections 131, 132 of microstrip line 43. However, most of the microwave directed by progressive wave 60 needs to be output to output section 131. Likewise, the microwave is radiated from cross opening 41 by reflected wave 61 propagating in the direction of arrow I is output to both output sections 131, 132 of microstrip line 43. However, most of the microwave directed by reflected wave 61 needs to be output to output section 132.

As can be understood from the above, a configuration of microstrip line 43 facing cross opening 41 is important in causing predetermined output sections to provide outputs in the propagating direction of the microwaves.

The inventors of the present application have diligently studied a relative position of microstrip line 43 that faces cross opening 41. As a result of the study, a configuration in which microstrip line 43 is formed so as to surround central opening part 41c of cross opening 41 when viewed in a direction from printed circuit board 42 to cross opening 41 can accomplish the achievement.

In the present exemplary embodiment, therefore, the configuration is made by microstrip line 43 surrounding central opening part 41c. More specifically, microstrip line 43 includes: first line 43a and second line 43b that are substantially (subsuming completely) vertical to tube axis L1 of waveguide 40; and third line 43c that is connected to the first ends of first line 43a and second line 43b and substantially (subsuming completely) parallel to tube axis L1 of waveguide 40. As illustrated in FIG. 12, each of first line 43a and second line 43b is formed so as to be long enough to face (traverse) the two openings making up cross opening 41 which are formed in the direction of length 41w. In addition, third line 43c is formed so as not to face the openings of cross opening 41.

As a result, microstrip line 43 configured above causes most of the microwave radiated from cross opening 41 by progressive wave 60 to be output to output section 131 of microstrip line 43. Also, microstrip line 43 causes most of the microwave radiated from cross opening 41 by reflected wave 61 to be output to output section 132 of microstrip line 43.

The method of causing the predetermined output sections to provide the most of the outputs also needs to be applied to an environment in which waveguide 40 is used to transmit progressive wave 60 and reflected wave 61 of the microwave propagate in directions opposite to each other. Therefore, the arrangement in which microstrip line 43 surrounds central opening part 41c of cross opening 41 needs to have symmetry. In the present exemplary embodiment, thus, first line 43a and second line 43b of microstrip line 43 are disposed a substantially (subsuming completely) equal distance away from central opening part 41c.

The above configuration can improve precision in which the directional coupler separately detects progressive wave 60 and reflected wave 61.

When progressive wave 60 and reflected wave 61 propagate in the opposite directions inside waveguide 40, a standing wave is generated inside waveguide 40. This standing wave might lower the precision of separately detecting progressive wave 60 and reflected wave 61.

To reduce an influence of the standing wave, the inventors of the present application have studied a distance 43g between first line 43a and second line 43b of microstrip line 43. The result will be described with reference to FIGS. 13 to 15.

Furthermore, the inventors of the present application have studied dimensional sizes of cross opening 41, microstrip line 43, waveguide 40, and other components, a frequency band of the microwave, and the detection power ratio of the directional coupler.

Figure 13:
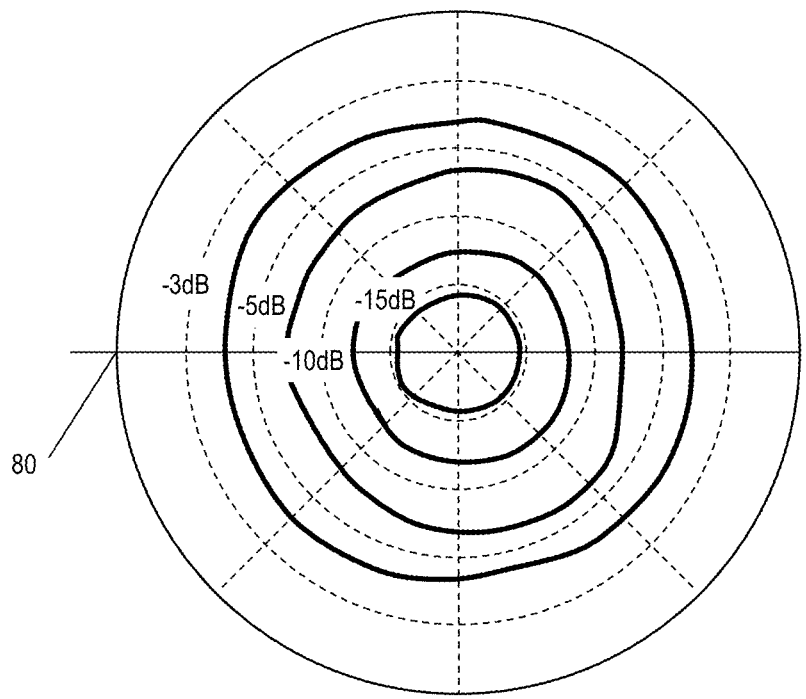
FIG. 13 is a polar coordinate diagram illustrating an output characteristic of a reflected wave detector in the directional coupler in FIG. 9.
Figure 14:
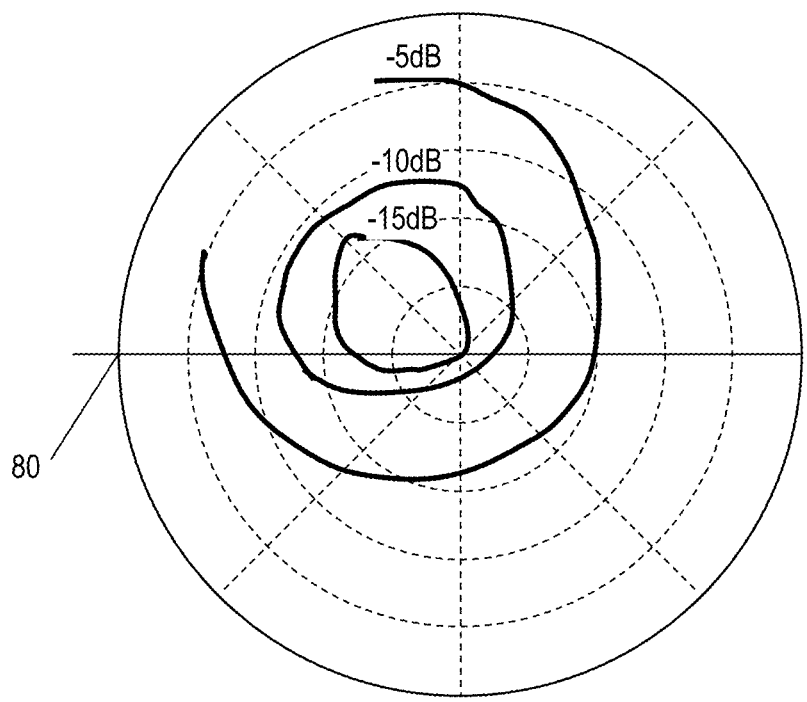
FIG. 14 is a polar coordinate diagram illustrating an output characteristic of a reflected wave detector in another configuration of the directional coupler in FIG. 9.
Figure 15:
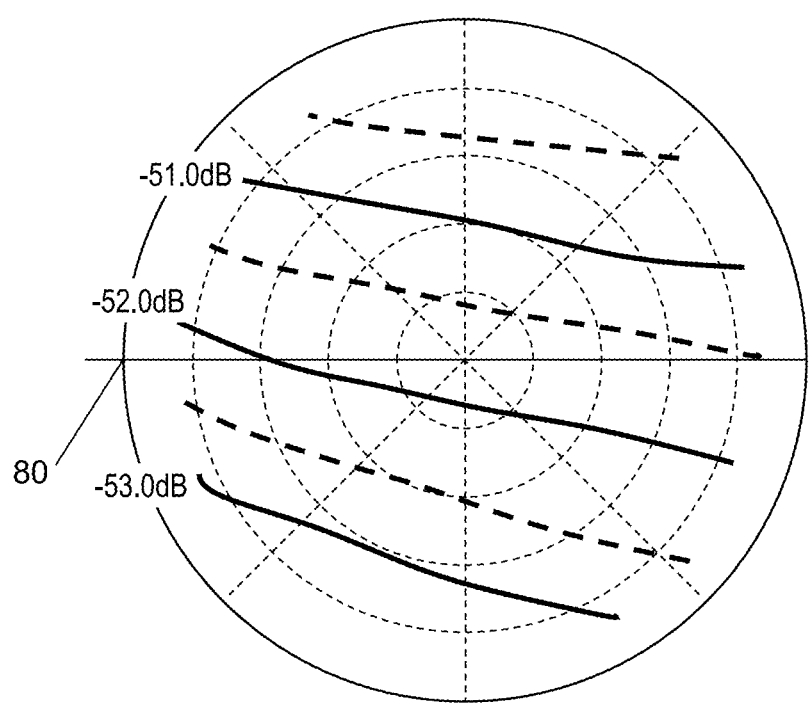
FIG. 15 is a polar coordinate diagram illustrating an output characteristic of a progressive wave detector in the directional coupler in FIG. 9.

FIG. 13 is a polar coordinate diagram illustrating an output characteristic of the reflected wave detector in directional coupler 30 when distance 43g between first line 43a and second line 43b is set to 4 mm. FIG. 14 is a polar coordinate diagram illustrating an output characteristic of the reflected wave detector in directional coupler 30 when distance 43g between first line 43a and second line 43b is set to 2 mm. FIG. 15 is a polar coordinate diagram illustrating an output characteristic of the progressive wave detector in directional coupler 30 under the condition of FIG. 13.

The polar coordinate diagrams of FIGS. 13 and 14 are obtained with the following configuration and under the following condition.

More specifically, as described above, the characteristic was evaluated using dimensions in which the width and height of wave guide 40 were 100 mm and 30 mm, respectively, the thickness of the wall surfaces was 0.6 mm, length 41w of cross opening 41 was 20 mm, and width 41d of cross opening 41 was 2 mm.

First, a first end of waveguide 40 configured above was connected to a microwave input terminal, whereas a second end of waveguide 40 was connected to a load with which the level and phase of reflected wave 61 were variable. Then, a microwave signal was supplied to waveguide 40 via the microwave input terminal.

The level and phase of reflected wave 61 were varied by adjusting the load connected to the second end of waveguide 40, after which the powers of the microwave detected by output section 131 (progressive wave detection) and output section 132 (reflected wave detection) of microstrip line 43 were measured by a network analyzer. The power of the microwave (progressive wave) detected by output section 131 was denoted by S21. The power of the microwave (reflected wave) detected by output section 132 was denoted by S31.

Then, a difference (S31-S21) was calculated, and the resultant values were plotted on the polar coordinate display of the Smith chart. In this way, the polar coordinate diagrams of FIGS. 13 and 14 are obtained.

The polar diagrams of FIGS. 13 and 14 have reference plane 80 in which values at the input terminal of the load are displayed as reference, and totally reflects progressive wave 60 and causes the phase to vary by 180 degrees.

In the center of the polar coordinate display, power S31 of reflected wave 61 becomes zero. On outer edge, namely, the circumference of the polar coordinate display, all progressive wave 60 turns into reflected wave 61. In short, power S31 of reflected wave 61 increases from the center toward the outer edge, namely, circumference of the polar coordinate display. In other words, the value (S31-S21) obtained by subtracting power S21 of progressive wave 60 from power S31 of reflected wave 61 decreases. It should be noted that the negative value decreases in FIGS. 13 and 14, because FIGS. 13 and 14 are expressed in decibels (dB).

A circumferential direction of the polar coordinate display is related to a phase and represents a phase of reflected wave 61 at a location where directional coupler 30 is disposed. In FIGS. 13 and 14, an input plane of the load is used as a reference plane, and thus the phase is displayed by relative values. On the same circumference of the polar coordinate display, reflected wave 61 differs in phase but the power (level) of reflected wave 61 is equal. When the values (S31-S21) obtained by subtracting power S21 of progressive wave 60 from power S31 of reflected wave 61 are plotted at polar coordinates, a contour made up of the values is ideally created in a concentric fashion.

Then, the inventors of the present application have analyzed the characteristics of FIGS. 13 and 14.

As illustrated in FIG. 13, the result obtained when distance 43g between first line 43a and second line 43b is set to 4 mm indicates a characteristic in which counter (thick) lines are formed substantially concentrically.

As illustrated in FIG. 14, the result obtained when distance 43g is set to 2 mm indicates a characteristic in which a counter (thick) lines are shifted from the center of the polar coordinate display.

The inventors of the present application have confirmed that the result obtained when distance 43g is set to 8 mm indicates a characteristic that is substantially the same as a result, not illustrated, obtained when distance 43g is set to 2 mm.

From the above relationship, the inventors of the present application have found that it is possible to reduce generation of a standing wave by setting distance 43g appropriately in accordance with sizes of waveguide 40, cross opening 41, and other components.

Hereinafter, the above phenomenon (in which it is possible to reduce generation of a standing wave by setting distance 43g appropriately) will be considered.

In general, it is known that a direction in which the waveguide 40 propagates from cross opening 41 while rotating forms an angle of about 50 degrees upward with a direction in which the microwave propagates inside waveguide 40. Therefore, it is expected that it is possible to reduce generation of a standing wave by disposing first line 43a and second line 43b at a site to which the rotating microwave is radiated at an angle of about 50 degrees.

In other words, it is expected that it is possible to reduce generation of a standing wave by optimizing distance 43g between first line 43a and second line 43b and a distance between wide surface 40a of waveguide 40 and B-sided printed circuit board 42b on which microstrip line 43 is formed.

Therefore, the inventors of the present application disposed both first line 43a and second line 43b opposite to the opening of cross opening 41. In this case, the inventors of the present application set the distance between wide surface 40a of waveguide 40 and B-sided printed circuit board 42b on which microstrip line 43 is formed to an appropriate value, such as 5 mm to 7 mm and then studied a reduction in a standing wave. From the study, the inventors of the present application confirmed that it is possible to reduce generation of a standing wave.

Through the study, thus, the inventors of the present application have achieved compact directional coupler 30 that is mountable in waveguide 40.

With reference to FIG. 15, next, a description will be given of an output characteristic, related to a progressive wave, of directional coupler 30 whose shape and dimension are set to the above values.

FIG. 15 is a polar coordinate diagram illustrating an output characteristic of the progressive wave detector in the directional coupler in FIG. 9. In FIG. 15, power S21 of the microwave (corresponding to the progressive wave) detected by output section 131 of directional coupler 30 is displayed at polar coordinates.

As illustrated in FIG. 15, a detection value of the progressive wave which reflects a variation in a load fluctuates in a range from −50.5 dB to −53.0 dB within the polar coordinate region.

As the fluctuation range becomes narrower, corresponding detection circuit 45 can process the signal more easily. If the fluctuation occurs to the extent described above, a low-cost component can be used as Schottky diode 47 in each detection circuit 45. Even if low-cost components are used, each detection circuit 45 can process the signal easily.

It should be noted that the region surrounded by first line 43a, second line 43b, and third line 43c has not been described above but is preferably set to be smaller than cross opening region 41a. As illustrated in FIG. 12, each of first line 43a and second line 43b is preferably positioned in a substantially center between central opening part 41c and an edge (right or left edge in FIG. 12) of cross opening region 41a. Moreover, third line 43c is more preferably positioned in a substantially center between central opening part 41c and an edge (upper edge denoted by an alternate long and short dash line in FIG. 12) of cross opening region 41a. This configuration can precisely detect the progressive and reflected waves that have been supplied to the directional coupler.

In the above description, as an example, an opening shape of cross opening 41 is an X shape in which two long holes intersect each other; however, the present invention is not limited to this example. As an alternative example, the opening shape of cross opening 41 may be any shape in which two or more long holes are inclined at different angles with respect to tube axis L1 of waveguide 40. The opening shape of cross opening 41 may be any shape in which two or more long holes intersect one another with their intersecting portions shifted from the centers. Furthermore, the opening shape of cross opening 41 may be, for example, an L or T shape. The opening shape of cross opening 41 may include a combination of three or more long holes. The inventors of the present application have confirmed that the electric field can rotate to radiate a circularly polarized wave even when the intersecting angle of cross opening 41 having an X shape is varied by about 30 degrees from the right angle. However, the formation in which two long holes are disposed in X form so as to be orthogonal to each other at their center, as in the present exemplary embodiment, is more preferable, because this formation enables a circularly polarized wave having a substantially perfect circular shape to be radiated.

Alternatively, the opening shape of cross opening 41 may be circular or polygonal. In short, as described above, the opening shape may be any shape in which two or more long holes are inclined at different angles with respect to tube axis L1 of wave guide 40. Therefore, the opening shape may be a circular shape formed with many long holes disposed with their angles slightly differing from one another or may be a square shape formed with a line connecting the four peaks of an X-shaped long holes. The opening shape may be an elliptical, rectangular, or trapezoidal shape formed by pressing a circular or square shape. The opening shape may be a polygonal shape other than a rectangular shape or a tortuous shape, such as a heart or star shape. However, a circular shape and a rectangular shape are less likely to be deformed than tortuous shapes, such as an X shape, and thus more effective.

As described above, a microwave heating device according to the present invention includes: a heating chamber that accommodates an object to be heated; a microwave generator that generates a microwave to be supplied to the heating chamber; a waveguide through which the microwave generated by the microwave generator propagates to the heating chamber; a radiation antenna that radiates the microwave propagating inside the waveguide to the heating chamber; and a rotary driver that rotates the radiation antenna. Furthermore, the microwave heating device includes: a reflected wave detector that detects at least part of a reflected wave inside the waveguide; and a controller that controls a direction in which the radiation antenna faces by controlling driving of the rotary driver based on a reflected wave detection amount detected by the reflected wave detector. The controller controls the rotary driver so as to stop the rotation of the radiation antenna when the radiation antenna faces in the direction in which the reflected wave detection amount is minimized and when the radiation antenna faces in a different direction different from the direction in which the reflected wave detection amount is minimized.

According to this configuration, first, the radiation antenna stops its rotation when facing in a direction in which the reflected wave detection amount is minimized. The object is thereby heated for an extended period of time under the most efficient heating condition. As a result, the heating efficiency is improved in comparison with a case where heating is performed while the radiation antenna is constantly rotating. Second, the radiation antenna stops its rotation when facing in the different direction different from the direction in which the reflected wave detection amount is minimized. In this case, the microwave radiated from the radiation antenna causes uneven heating when the radiation antenna stops while facing in the direction in which the reflected wave detection amount is minimized as well as in the different direction.

However, the effect of the uneven heating caused in relation to the direction in which the reflected wave detection amount is minimized is expected to be canceled out by the effects of the uneven heating caused in relation to the different direction. Consequently, it is possible to provide even heating in comparison with the case where the radiation antenna stops only when facing in the direction in which the reflected wave detection amount is minimized. In other words, it is possible to both improve heating efficiency and perform even heating at the same time.

The controller in the microwave heating device according to the present invention may control the rotary driver so as to vary stop time of the radiation antenna depending on the direction and the different direction in which the radiation antenna faces. This can vary distribution of uneven heating caused when the radiation antenna stops while facing in the individual directions. Consequently, it is possible to appropriately adjust the stop times, depending on which of improved heating efficiency and even heating is prioritized, thereby achieving uneven heating in accordance with a user's preference.

The controller in the microwave heating device according to the present invention may control the rotary driver so as to set the stop time related to the direction in which the reflected wave detection amount is minimized to be shorter than the stop time related to the different direction.

According to the above configuration, when the radiation antenna faces in the direction in which the reflected wave detection amount is minimized, the object is heated with the highest efficiency. Thus, if a time over which the radiation antenna stops while facing in the direction in which the reflected wave detection amount is minimized is set to be the same as a time over which the radiation antenna stops while facing in the different direction, uneven heating may be more prominent. In contrast, when the radiation antenna faces in the different direction, the object is heated with lower efficiency than when the radiation antenna faces in the direction in which the reflected wave detection amount is minimized. Thus, when the radiation antenna faces in the different direction, the microwave radiated from the radiation antenna may cause somewhat slightly uneven heating of the object. For this reason, the controller sets the time over which the radiation antenna stops while facing in the different direction to be longer. This can promote the uneven heating caused by the microwave radiated from the radiation antenna when the radiation antenna faces in the different direction. In this case, the effects of the uneven heating can be cancelled out in balance. In this way, it is possible to both improve the heating efficiency and perform even heating at the same time while achieving further even heating.

The microwave heating device according to the present invention further includes an incident wave detector that detects at least part of the incident wave inside the waveguide. From incident and reflected wave detection amounts related to a plurality of different directions in which the radiation antenna stops, the controller calculates amounts of the microwave absorbed by the object. Then, the controller may control rotary driver so as to equalize the products of the calculated absorption amounts and the stop times at the respective stop locations.

In this case, the products of the absorption amounts and the stop times are each equivalent to absorption energy absorbed by the object. Therefore, the controller equalizes the absorption energies that cause uneven heating in relation to the direction in which the reflected wave detection amount is minimized and in relation to a plurality of different directions. In this way, it is possible to cancel out the effects of the uneven heating in best balance. Consequently, it is possible to both improve the heating efficiency and perform even heating at the same time while maximally performing the even heating.

In a case where the radiation antenna in the microwave heating device according to the present invention stops at an N number of locations, the controller may set a reference direction of the radiation antenna to the direction in which the reflected wave detection amount is minimized, and control the rotary driver so as to, first, stop the rotation of the radiation antenna when the radiation antenna faces in the reference direction and then sequentially stop the rotation of radiation antenna whenever the radiation antenna rotates by (360/(N+1)) degrees.

In this configuration, if the object to be heated is small in size or resists uneven heating according to a menu, N denoting the number of different directions is set to 1, for example. Setting N in this manner can increase the proportion of the direction in which the reflected wave detection amount is minimized, namely, in which the heating is performed with the highest efficiency, thereby performing the heating with preferentially improved heating efficiency. If the object to be heated is large in size or subject to uneven heating according to a menu, N denoting the number of different directions is set to 3, for example. Setting N in this manner can increase the proportions of the different directions, thereby performing even heating preferentially and moreover can easily adjust the priority orders of an improvement of the efficiency and the maintenance of even heating.

In the microwave heating device according to the present invention, in a case where a number of different directions in which the radiation antenna stops is set to 1, the controller may control the rotary driver so as to stop the radiation antenna when the radiation antenna faces in the direction in which the reflected wave detection amount is minimized and when the radiation antenna faces in the different direction obtained by rotating the radiation antenna by 180 degrees. In this way, it is possible to do cooking with an improvement in the heating efficiency prioritized.

INDUSTRIAL APPLICABILITY

A microwave heating device according to the present invention is applicable to heating cookers that dielectrically heat an object, such as a food, by radiating a microwave to the object. More specifically, the microwave heating device is effectively applicable to ovens, grills and heating cookers that use a microwave and other heating means, such as heating steam, in combination. Moreover, the microwave heating device according to the present invention is effectively applicable to drying apparatuses, pottery heating apparatuses, garbage disposers, and other industrial apparatuses, including semiconductor manufacturing apparatuses and chemical reactors.

REFERENCE MARKS IN THE DRAWINGS 1 microwave oven (microwave heating device)
2 heating chamber space
2a heating chamber
2b power feeding chamber
2bb, 14a, 14b opening
2c, 2d side wall
3 magnetron (microwave generator)
3a output end
4, 40 waveguide
5 radiation antenna (waveguide-structured antenna)
6 mounting table
7 coupling part
7a coupling shaft
7b flange
8 waveguide structure
11 bottom surface
13 open end
15 motor (rotary driver)
16 infrared sensor
17 controller
18a, 18b projection
20 grill plate
20a periphery
20ad corner part
20b groove
20c plate
20d insulating part
20e microwave absorbing heat generator
20f bottom surface
21, 31 object to be heated
22a, 22b, 22c, 22d corner
30 directional coupler (reflected wave detector)
32a, 32b, 32c, 32d heated area
40a wide surface
41 cross opening
41a cross opening region
41c central opening part
41d width
41w length
42 printed circuit board
42a A-sided printed circuit board
42b B-sided printed circuit board
43 microstrip line
43a first line
43b second line
43c third line
43d, 43e line
43g distance
44 support part
44a flange surface
45 detection circuit
46 chip resistor
47 Schottky diode
48, 49 detected wave output section
48a, 49a connector
50a, 50b, 50c, 50d printed circuit board mounting hole
51a, 51b pinhole
60 incident wave (progressive wave)
61 reflected wave
62 rotating radiation
80 reference plane
131, 132 output section
141, 142 extraction section
201a, 201b, 201c, 201d screw
202a, 202b, 202c, 202d projecting screw part
D1 dimension
E, F, H, I arrow
G center of rotation
J central line
L1 tube axis

The invention claimed is:

1. A microwave heating device comprising:
a heating chamber that accommodates an object to be heated;
a microwave generator that generates a microwave to be supplied to the heating chamber;
a waveguide through which the microwave generated by the microwave generator propagates to the heating chamber;
a radiation antenna arranged in a power feeding chamber that radiates the microwave propagating inside the waveguide to the heating chamber;
a rotary driver that rotates the radiation antenna;
a wave detector that detects at least part of a reflected wave inside the waveguide; and
a controller that controls a direction in which the radiation antenna faces by controlling driving of the rotary driver based on a reflected wave detection amount detected by the wave detector, wherein
the controller is configured to control the rotary driver so as to stop the radiation antenna when the radiation antenna faces in two directions in which the reflected wave detection amount is minimized, and
one of the directions of the radiation antenna faces toward a right side inside the power feeding chamber, and the other one of the directions of the radiation antenna faces toward a left side inside the power feeding chamber, and the two directions are 180 degrees apart.

2. The microwave heating device according to claim 1, wherein the controller controls the rotary driver so as to vary stop times of the radiation antenna in relation to the one of the directions and the other one of the directions.

3. The microwave heating device according to claim 2, wherein the controller controls the rotary driver so as to set the stop time of the radiation antenna related to the one of the directions to be shorter than the stop time related to the other one of the directions.

4. A microwave heating device comprising:
a heating chamber that accommodates an object to be heated;
a microwave generator that generates a microwave to be supplied to the heating chamber;
a waveguide through which the microwave generated by the microwave generator propagates to the heating chamber;
a radiation antenna that radiates the microwave propagating inside the waveguide to the heating chamber;
a rotary driver that rotates the radiation antenna;
a wave detector that detects at least part of a reflected wave inside the waveguide; and
a controller that controls a direction in which the radiation antenna faces by controlling driving of the rotary driver based on a reflected wave detection amount detected by the wave detector, wherein
the controller controls the rotary driver so as to stop the radiation antenna when the radiation antenna faces in a direction in which the reflected wave detection amount is minimized and in a different direction different from the direction in which the reflected wave detection amount is minimized,
the wave detector detects an incident wave detection amount of at least part of an incident wave inside the waveguide, and
from the incident wave detection amount and the reflected wave detection amount that are related to each of a plurality of different directions in which the radiation antenna stops to face, the controller calculates absorption amounts of the microwave absorbed by the object, and controls the rotary driver so as to equalize products of the absorption amounts and stop times at respective stop locations.

5. A microwave heating device comprising:
a heating chamber that accommodates an object to be heated;
a microwave generator that generates a microwave to be supplied to the heating chamber;
a waveguide through which the microwave generated by the microwave generator propagates to the heating chamber;
a radiation antenna that radiates the microwave propagating inside the waveguide to the heating chamber;
a rotary driver that rotates the radiation antenna;
a wave detector that detects at least part of a reflected wave inside the waveguide; and
a controller that controls a direction in which the radiation antenna faces by controlling driving of the rotary driver based on a reflected wave detection amount detected by the wave detector, wherein
the controller controls the rotary driver so as to stop the radiation antenna when the radiation antenna faces in a direction in which the reflected wave detection amount is minimized and in a different direction different from the direction in which the reflected wave detection amount is minimized, and
when the radiation antenna stops at an N number of locations, the controller sets a reference direction of the radiation antenna to the direction in which the reflected wave detection amount is minimized, and controls the rotary driver so as to, first, stop the radiation antenna when the radiation antenna faces in the reference direction and then sequentially stop the radiation antenna whenever the radiation antenna rotates by $(360/(N+1))$ degrees.

6. The microwave heating device according to claim 5, wherein when a number of different angles in which the radiation antenna stops is set to 1, the controller controls the rotary driver so as to stop the radiation antenna when the radiation antenna faces in the direction in which the reflected wave detection amount is minimized and in the different direction obtained by rotating the radiation antenna by 180 degrees.

* * * * *